United States Patent [19]
Montgomery

[11] Patent Number: 5,634,797
[45] Date of Patent: Jun. 3, 1997

[54] HEART DEFECT TEACHING AID

[76] Inventor: Mary B. Montgomery, 7 Hampton Dr., Warrenville, S.C. 29851

[21] Appl. No.: 435,458

[22] Filed: May 5, 1995

[51] Int. Cl.$^6$ .................................................. G09B 23/30
[52] U.S. Cl. ........................................... 434/268; 434/272
[58] Field of Search ..................................... 434/262, 265, 434/267, 268, 272

[56] References Cited

U.S. PATENT DOCUMENTS

| | | | |
|---|---|---|---|
| 3,009,267 | 11/1961 | Bezark | 434/272 |
| 3,562,925 | 2/1971 | Baermann et al. | 434/265 |
| 3,568,333 | 3/1971 | Clark | 434/265 |
| 3,688,008 | 8/1972 | Krieger, Sr. | 434/268 |
| 3,704,528 | 12/1972 | Lewis | 434/268 |
| 3,748,366 | 7/1973 | Rader et al. | 434/272 |
| 3,855,714 | 12/1974 | Block . | |
| 4,288,222 | 9/1981 | Kling | 434/272 |
| 4,323,350 | 4/1982 | Bowden, Jr. . | |
| 4,601,668 | 7/1986 | Sirota . | |
| 4,768,960 | 9/1988 | Pan . | |
| 4,773,865 | 9/1988 | Baldwin | 434/268 |
| 5,197,885 | 3/1993 | Friedel . | |
| 5,356,295 | 10/1994 | Grosz | 434/272 |
| 5,411,437 | 5/1995 | Weber et al. | 434/272 |

*Primary Examiner*—Paul J. Hirsch
*Attorney, Agent, or Firm*—Richard C. Litman

[57] ABSTRACT

A teaching aid comprises a doll with a realistic, replaceable heart model. The heart model is attached to a pump unit that provides realistic flow of sonographically partially opaque fluid through the heart. The heart model may be selected from a variety of heart models, such as a normal heart or one of numerous congenitally diseased hearts. By using sonographic analysis of the doll, a student of heart diseases or a student of sonography may experience a realistic simulation of sonographic images of actual heart defects.

9 Claims, 31 Drawing Sheets

HEART DEFECT TEACHING AID

BACKGROUND OF THE INVENTION

1. Field of the Invention

The present invention relates generally to anatomical teaching aids, and more specifically to teaching aids that teach sonographic analysis of heart defects.

2. Description of the Prior Art

Congenital heart defects are a common and serious problem among infants. Such defects must be recognized as soon as medically possible if an infant is to survive. Yet, the trauma of exploratory surgery of each infant potentially afflicted by a heart defect would, needless to say, be unacceptable. For this reason, sonography, also known as ultrasound, is commonly used to visualize the major features of an infant's circulatory system. This non-invasive procedure allows observations of the paths of blood flow through the heart and the major arteries and veins. However, the images provided by sonography must be correctly interpreted before they can be useful. Correct interpretation of sonographic images is an important skill that requires practice to develop. Without such skill, a sonographer could make a mistake leading ultimately to the unnecessary death of an infant.

Development of this skill can best be accomplished by viewing of actual sonographic images. For better or worse, however, it is often the case at teaching facilities that there is not a convenient, ready supply of infants with the particular defect of interest. Consequently, it is highly desirable to have a realistic model suitable for teaching interpretation of sonographic images of heart defects. While computerized simulations have been seen by some educators to be a cure for every teaching problem, there is no way a computer can effectively replace a three-dimensional model used to represent a human patient. What is needed is a model that will not only provide realistic sonographic images, but will also have the physical form of a real infant patient. Such a model would teach both the visual aspects of sonography, and the equally important mechanical procedure of correctly orienting the patient with respect to the sonographic equipment.

The use of teaching aids relating to medical information is common, and various attempts have been made to improve such teaching aids. None, however, meets the needs served by the present invention. For example, U.S. Pat. No. 3,855,714, issued on Dec. 24, 1974, to Bartley C. Block, describes a device and method for studying human gross anatomy. The device of this patent comprises two-dimensional representations of anatomical parts which can be laid upon one another to simulate the three-dimensional arrangement of parts of the human body. The device of this patent does not represent heart defects, has no three-dimensional structure of a heart, and is not suitable for use with sonography.

U.S. Pat. 4,323,350, issued on Apr. 6, 1982, to Robert L. Bowden, Jr., describes an anatomical model that photographically depicts sections of the human torso. There is no physical structure representing body organs, and the model in the patent is not suitable for use in sonography.

U.S. Pat. 4,601,668, issued on Jul. 22, 1986, to Vladimir Sirota, describes a novelty toy in the form of a doll. The doll provides audible, and optionally visual, representation of a heart beat, and not of the heart, itself. There is no physical structure representing body organs, and the doll in the patent is not suitable for use in sonography.

U.S. Pat. 4,768,960, issued on Sep. 6, 1988, to Chiou-Wen S. Pan, describes a two-dimensional, symbolic representation of the human body and the perceived ill-effects of illegal drugs. The device of this patent does not represent heart defects, has no three-dimensional structure of a heart, and is not suitable for use with sonography.

U.S. Pat. 5,197,885, issued on Mar. 30, 1993, to Joan Friedel, describes a doll intended to discourage drug misuse. The doll has an illuminated "heart area," which comprises an openable flap. There is no physical structure realistically representing body organs, and the doll in the patent is not suitable for use in sonography.

None of the above inventions and patents, taken either singly or in combination, is seen to describe the instant invention as claimed.

SUMMARY OF THE INVENTION

A teaching aid according to the present invention comprises a doll with a realistic, replaceable heart. The heart is attached to a pump unit that provides realistic flow of fluid through the heart. The heart may be selected from a variety of types of hearts, such as a normal heart or one of numerous congenitally diseased hearts. By using sonographic analysis of the doll, a student of heart diseases or a student of sonography may experience a realistic simulation of sonographic images of actual heart defects.

Accordingly, it is a principal object of the invention to provide a teaching aid for teaching sonography.

It is another object of the invention to provide a teaching aid for teaching differences among congenital heart defects.

It is a further object of the invention to provide a realistic simulation of the heart and major arteries and veins, such that the simulation can be used with ordinary sonographic equipment in place of a live patient.

Still another object of the invention is to provide interchangeable hearts in a model of the human body, such that hearts of different types can be placed alternately in a single such model.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
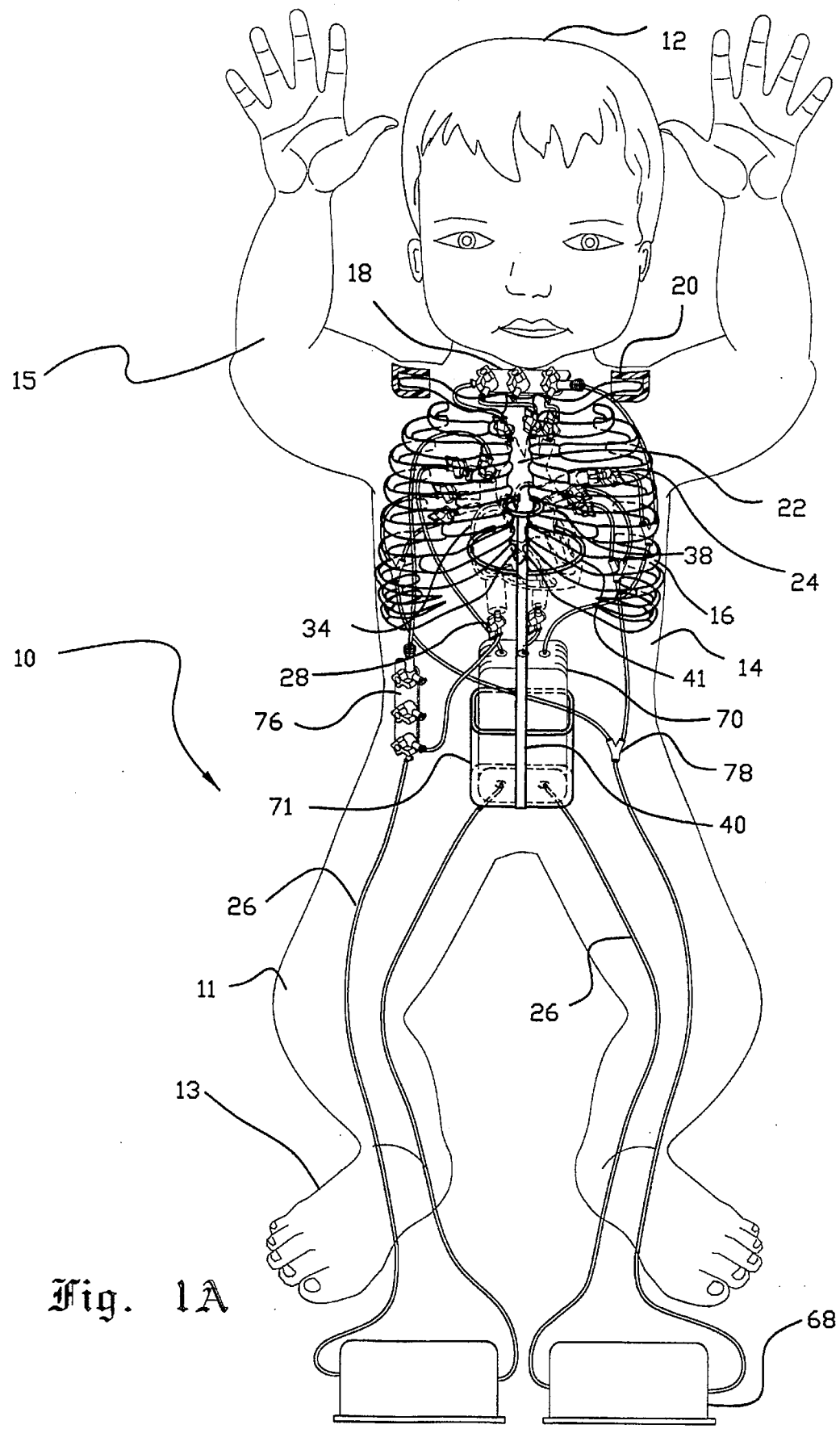
FIG. 1A is a front perspective, view of the present invention, shown with a normal heart and supporting ribs.

The importance of accurate sonographic interpretations of heart conditions in infants necessitates a teaching model that not only demonstrates the nature of potential heart defects, but also teaches proper use of a sonography machine with an infant form. The present invention provides such a model.

Referring to FIGS. 1A, 1B, 1C, 2A and 2B of the drawings, the teaching aid 10 according to the present invention has human form 12, including normal human physical features such as arms 15, legs 11, feet 13. The human form 12 of the teaching aid 10 is made of material substantially invisible to sonographic reading, preferably low density plastic:. The teaching aid 10 does not have metal parts which would be opaque when viewed with a sonograph to obtain an echo cardiogram.

There is a hollow chest cavity 14 in the teaching aid 10. This cavity 14 preferably has supporting partial ribs 16 open to the rear to prevent collapse of the cavity 14 under the weight of a transducer that is part of sonography equipment used with the teaching aid 10. The ribs 16 and flexible clavicle-like members 18 are connected to one another by a sternum-like member 22. The flexible clavicle-like members 18 anchor the ribs 16 within the cavity 14 by insertion into receptacles 20 with the cavity 14 dimensioned and configured to receive the clavicle-like members 18.

Terminal portions 24 of fluid-carrying body conduits 26 project into the cavity 14. These body conduits 26 lead variously to stop-cock style connector valves 28, to a fluid reservoir 70 and to pump units 68. The terminal portions 24 have connector valves 28 so as to enable connection of the body conduits 28 to other conduits 36 (FIGS. 1B and 2B ). Preferably, the connector valves 28 are configured such that fluid will not escape from the body conduits 26 when the terminal portions 24 are connected to heart conduits 36, yet fluid will flow freely from the body conduits 26 when the terminal portions 24 are connected to heart conduits 36. The connector valves 28 may also be configured by known means to allow fluid flow in one and only one direction.

Figure 3:
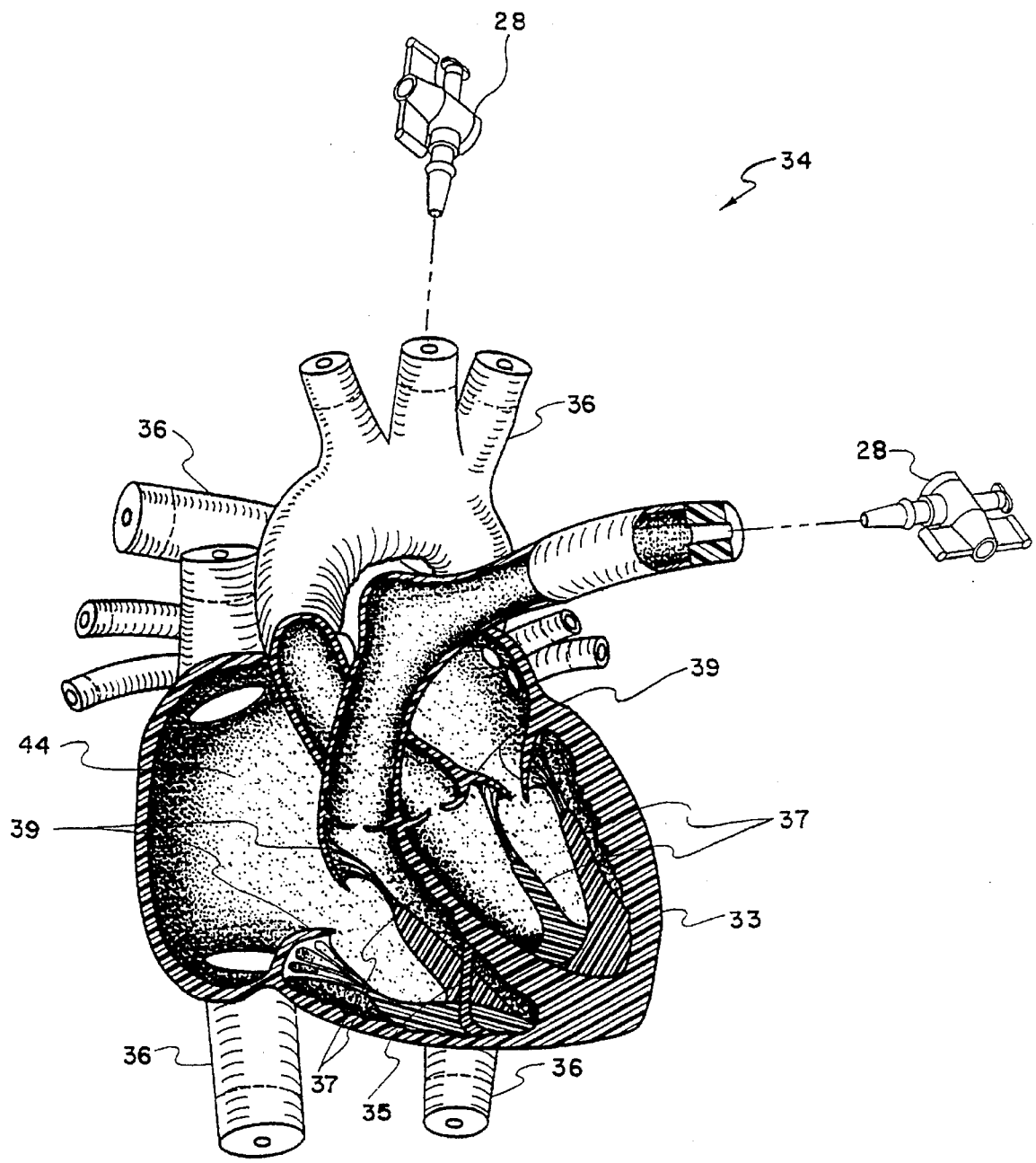
FIG. 3 is a partial cutaway front view of a normal heart and attachment valves, as used in the present invention.
Figure 4:
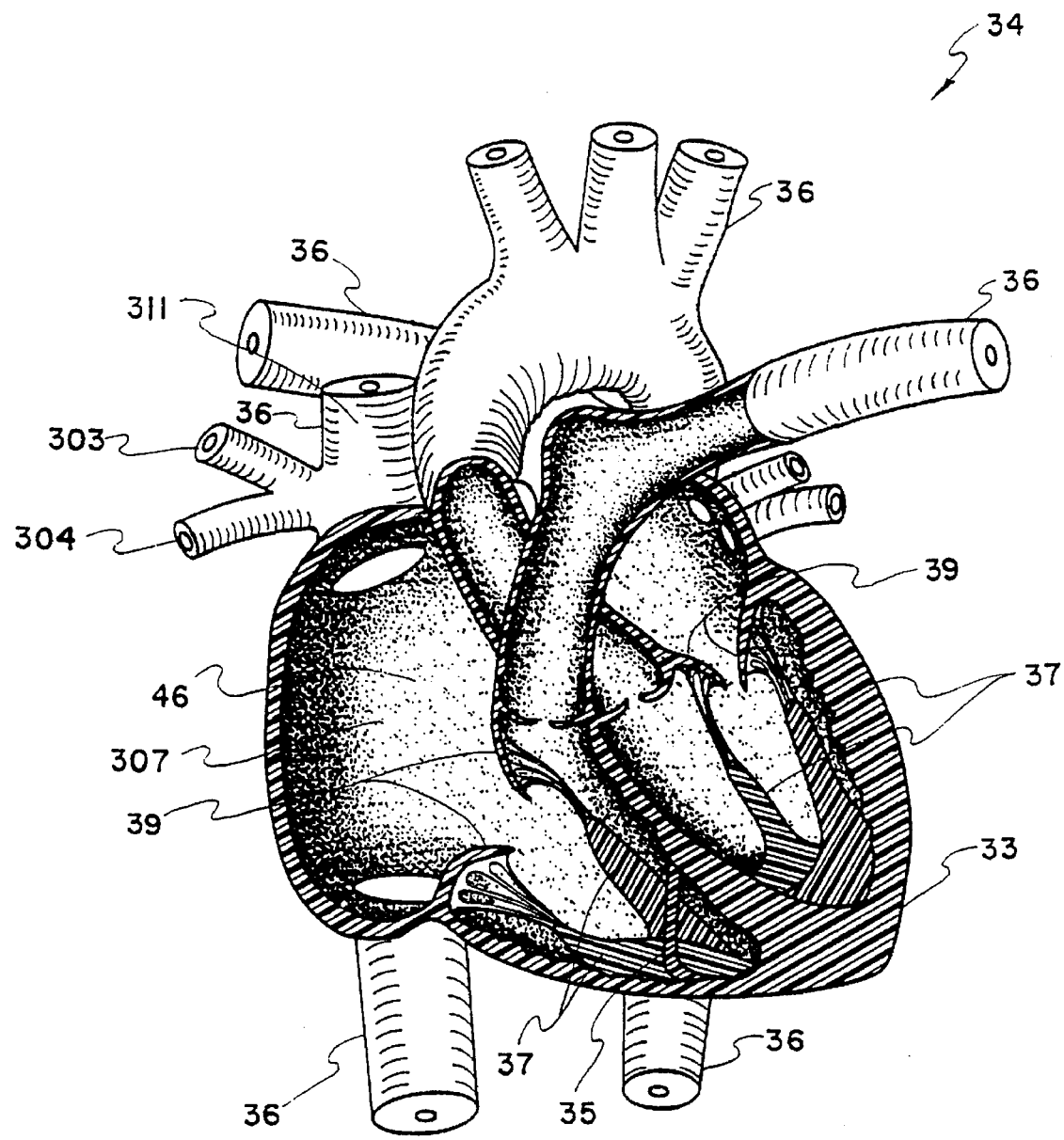
FIG. 4 is a partial cutaway front view of a heart of the present invention showing a first example of the Partial Anomalous Pulmonary Venous Return (PAPVR) disorder.
Figure 5:
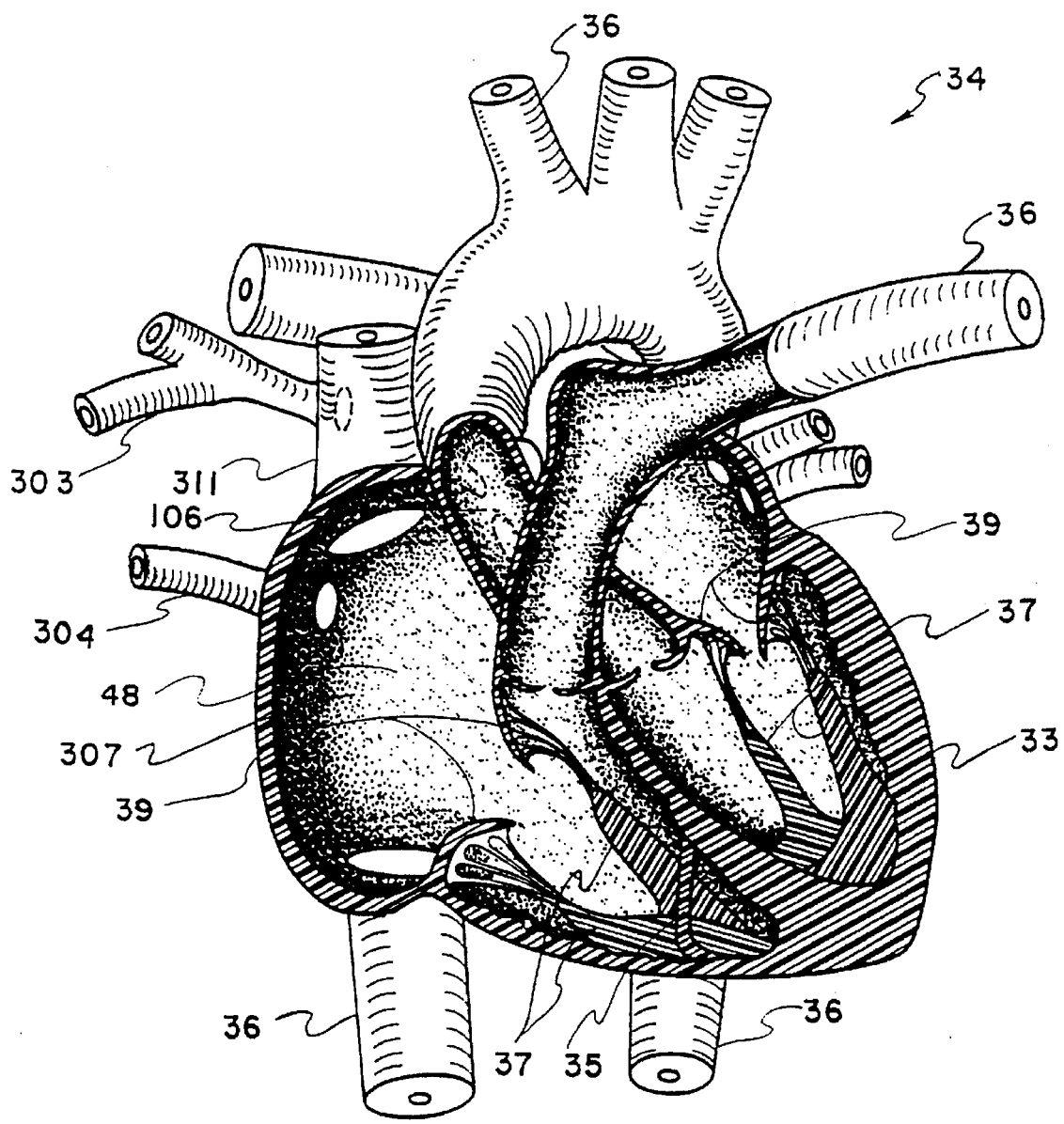
FIG. 5 is a partial cutaway front view of a heart of the present invention showing a second example of the Partial Anomalous Pulmonary Venous Return (PAPVR) disorder.
Figure 6:
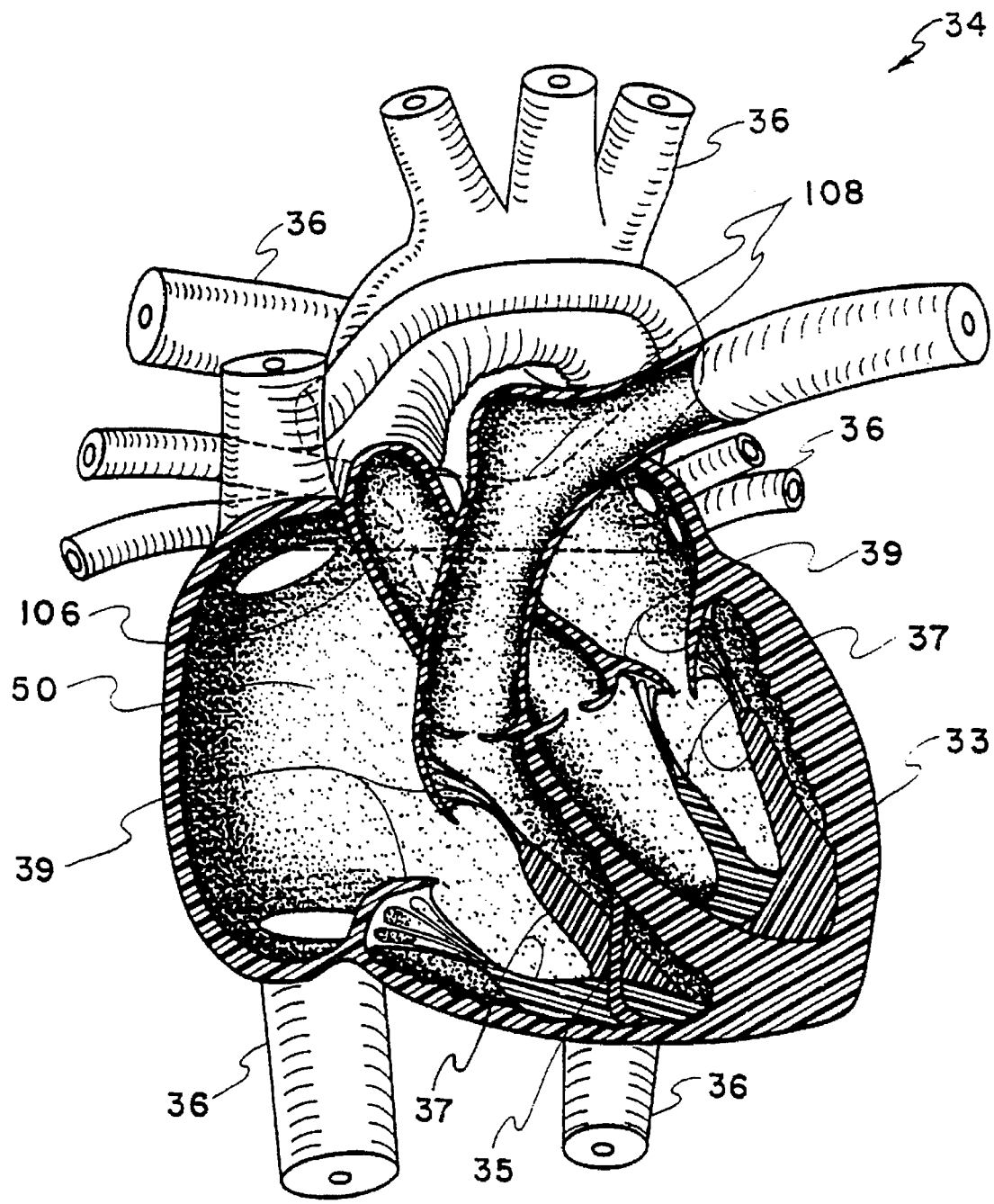
FIG. 6 is a partial cutaway front view of a heart of the present invention showing a first example of the Total Anomalous Pulmonary Venous Return (TAPVR) disorder.
Figure 7:
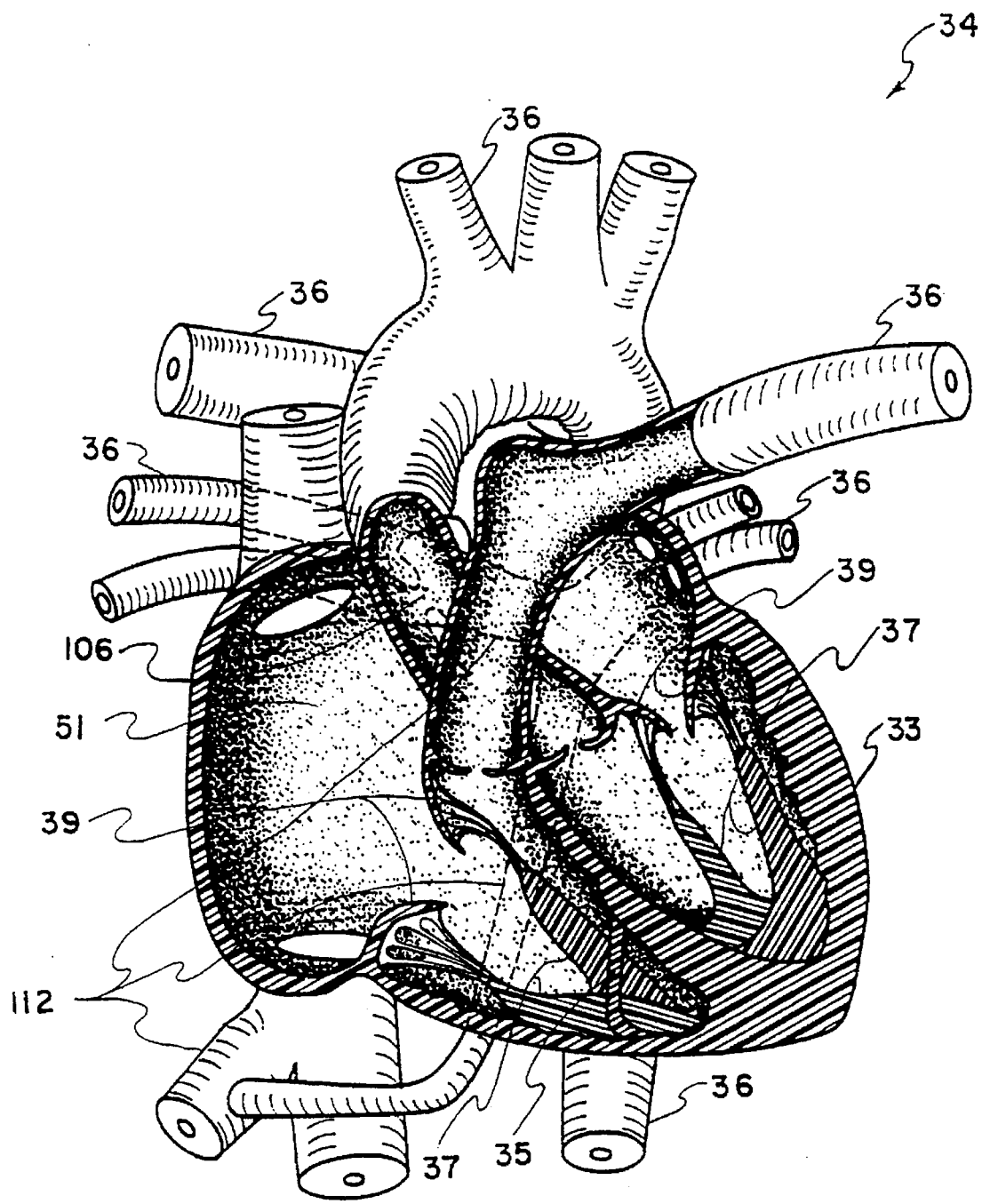
FIG. 7 is a partial cutaway front view of a heart of the present invention showing a second example of the Total Anomalous Pulmonary Venous Return (TAPVR) disorder.
Figure 8:
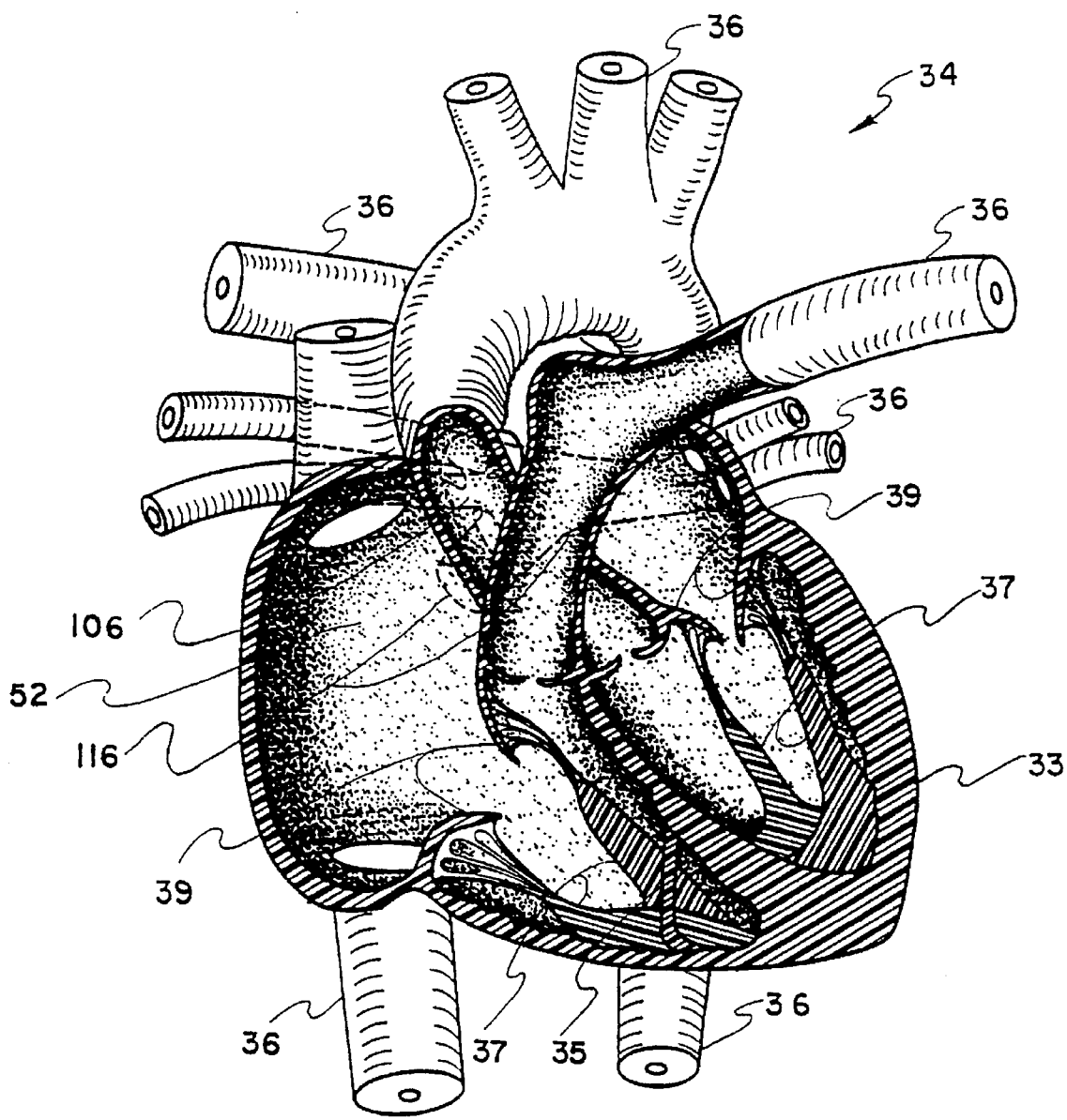
FIG. 8 is a partial cutaway front view of a heart of the present invention showing a third example of the Total Anomalous Pulmonary Venous Return (TAPVR) disorder.
Figure 9:
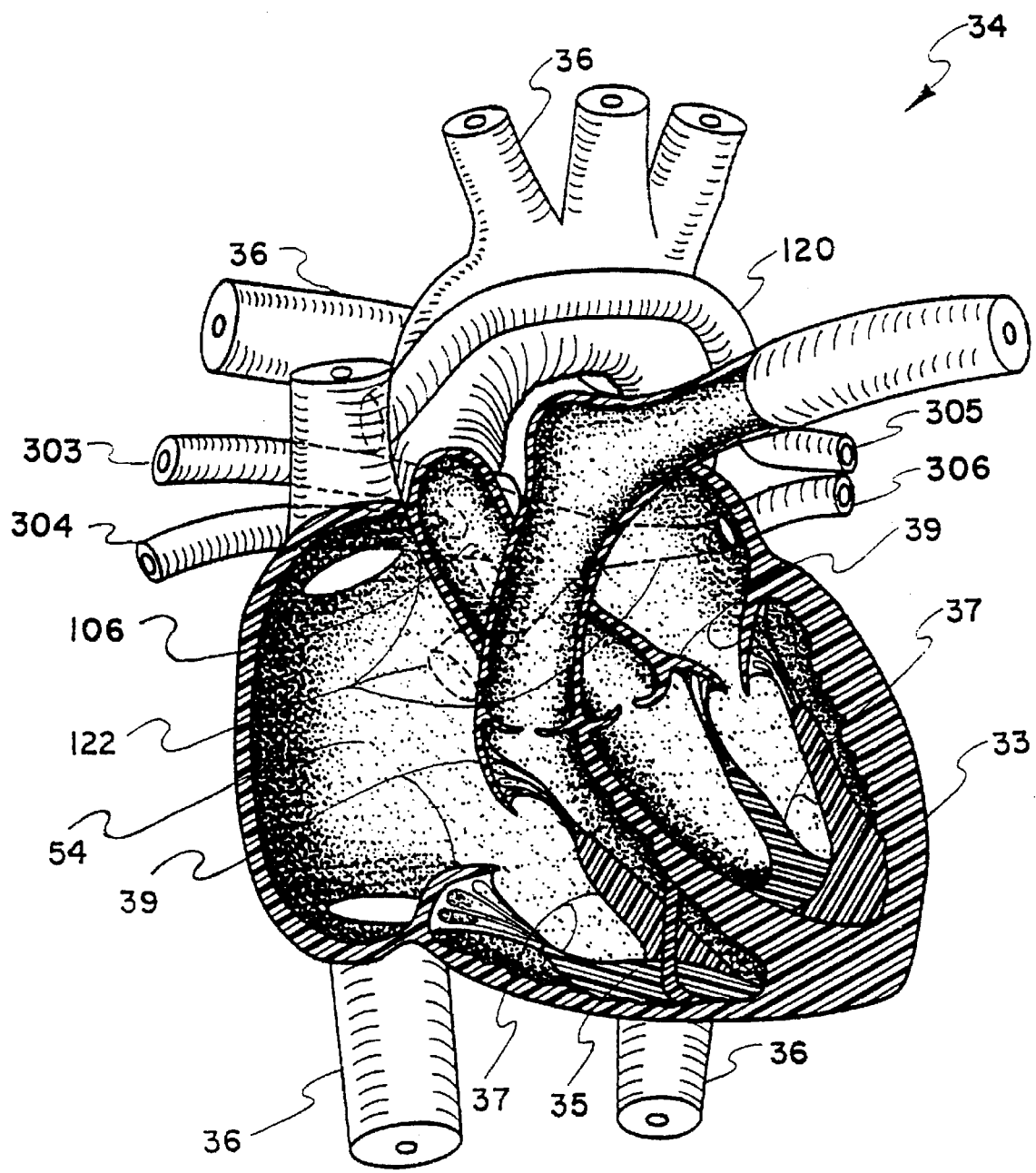
FIG. 9 is a partial cutaway front view of a heart of the present invention showing a fourth example of the Total Anomalous Pulmonary Venous Return (TAPVR) disorder.
Figure 10:
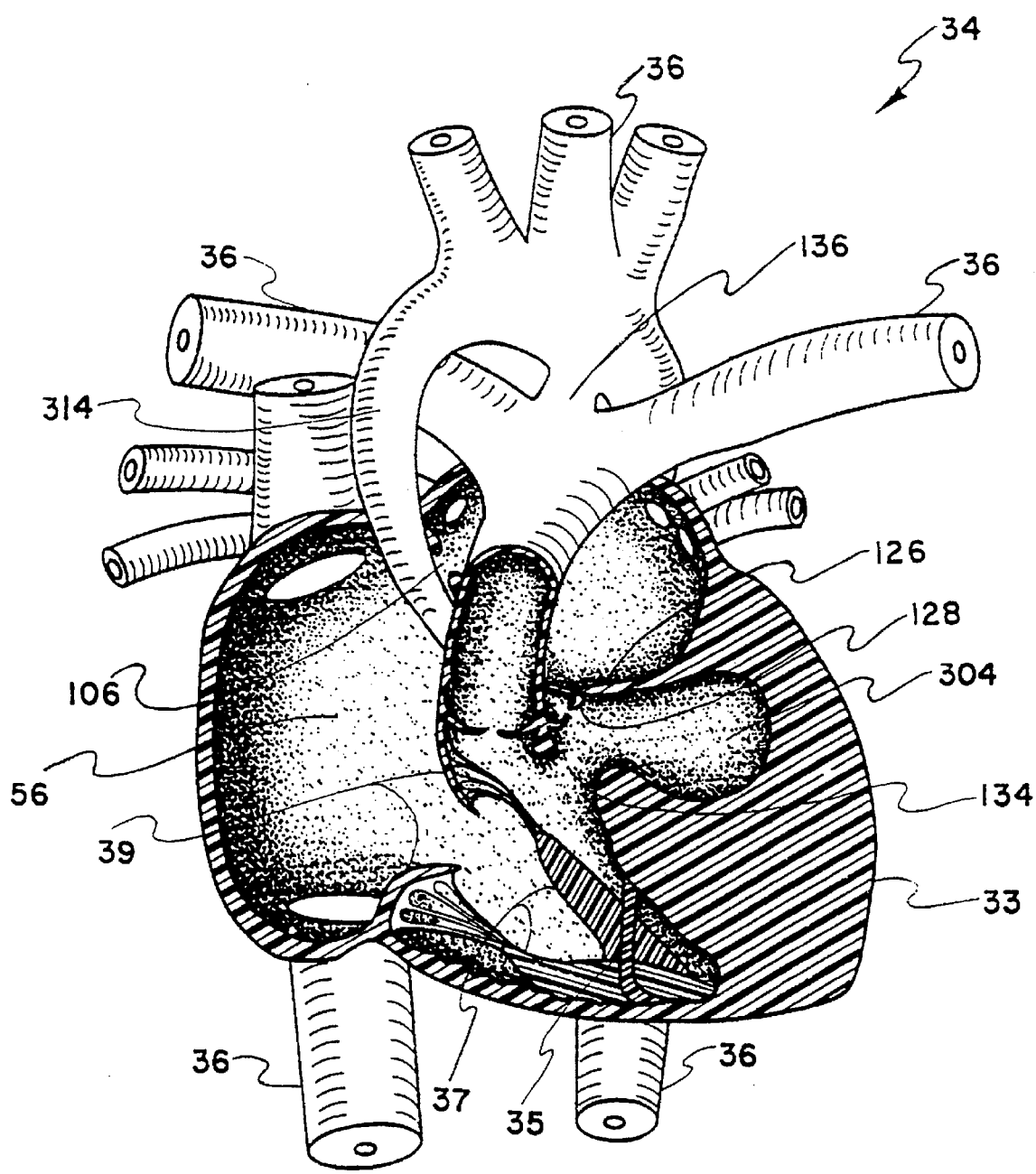
FIG. 10 is a partial cutaway front view of a heart of the present invention showing the Mitral Valve Atresia (MVA) disorder.
Figure 11:
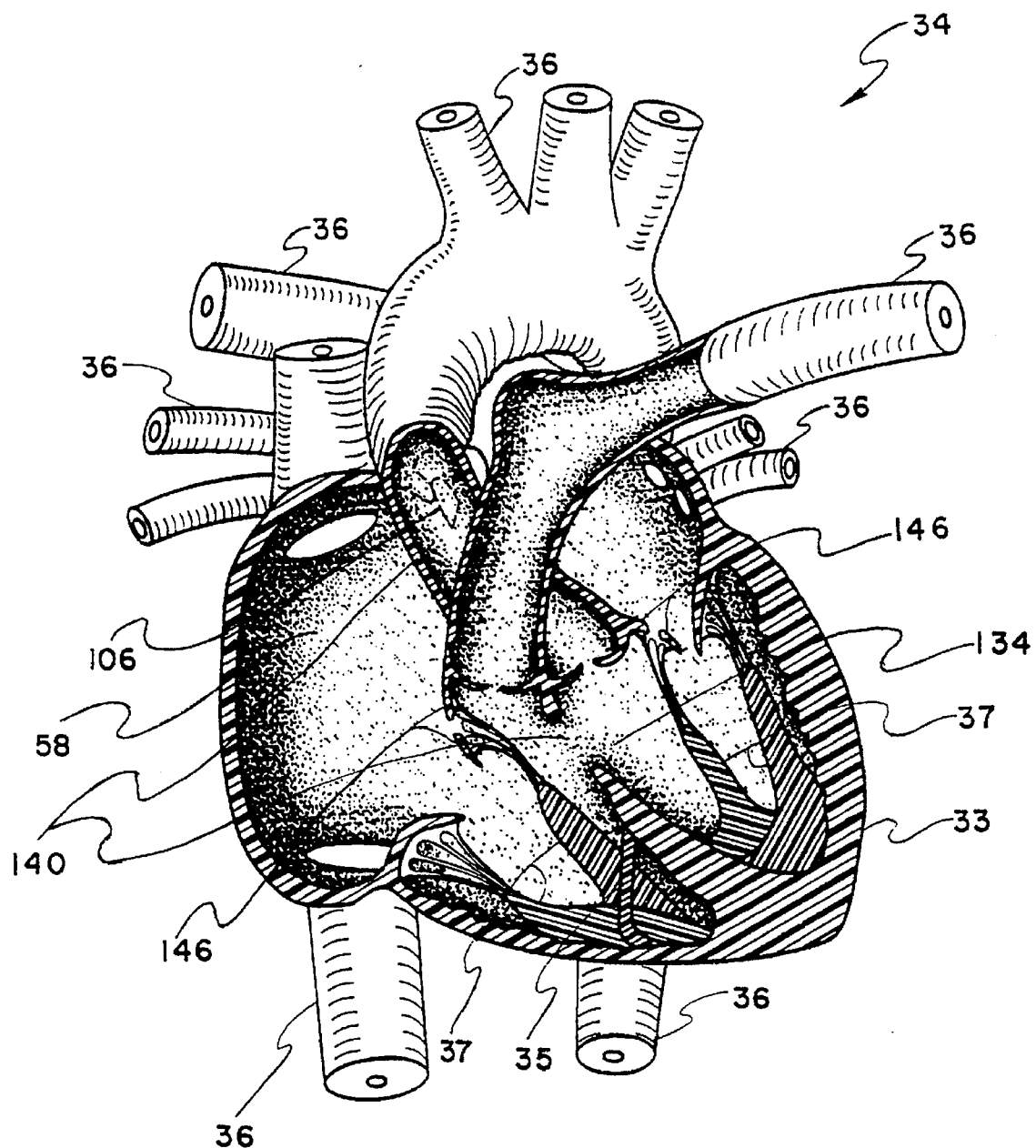
FIG. 11 is a partial cutaway front view of a heart of the present invention showing the Atrio-Ventricular Canal (AVC) disorder.
Figure 12:
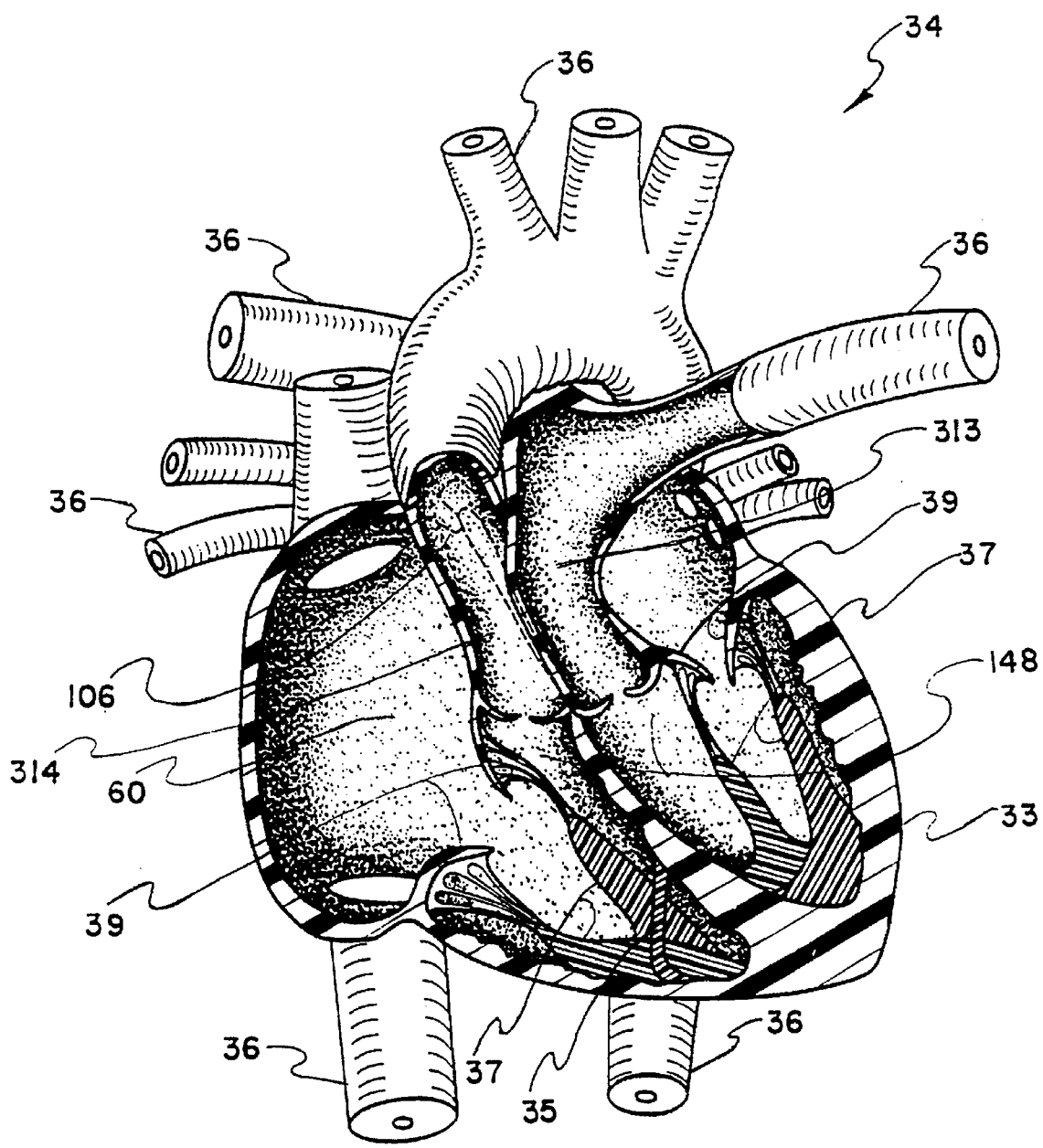
FIG. 12 is partial cutaway front view of a heart of the present invention showing the Transposition of the Great Vessels (TGV) disorder.
Figure 13:
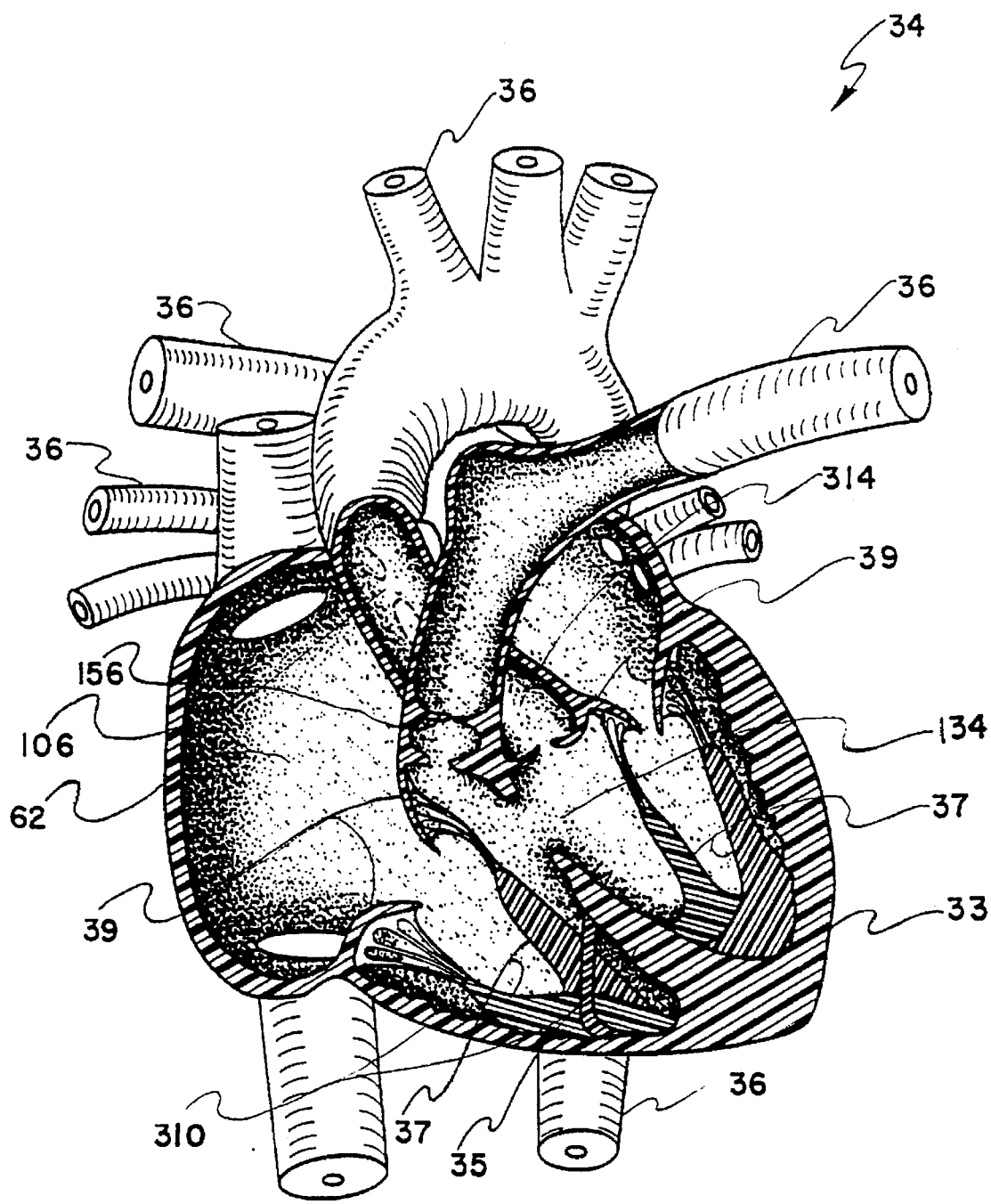
FIG. 13 is a partial cutaway front view of a heart of the present invention showing the Tetrology of Fallot (TF) disorder..
Figure 14:
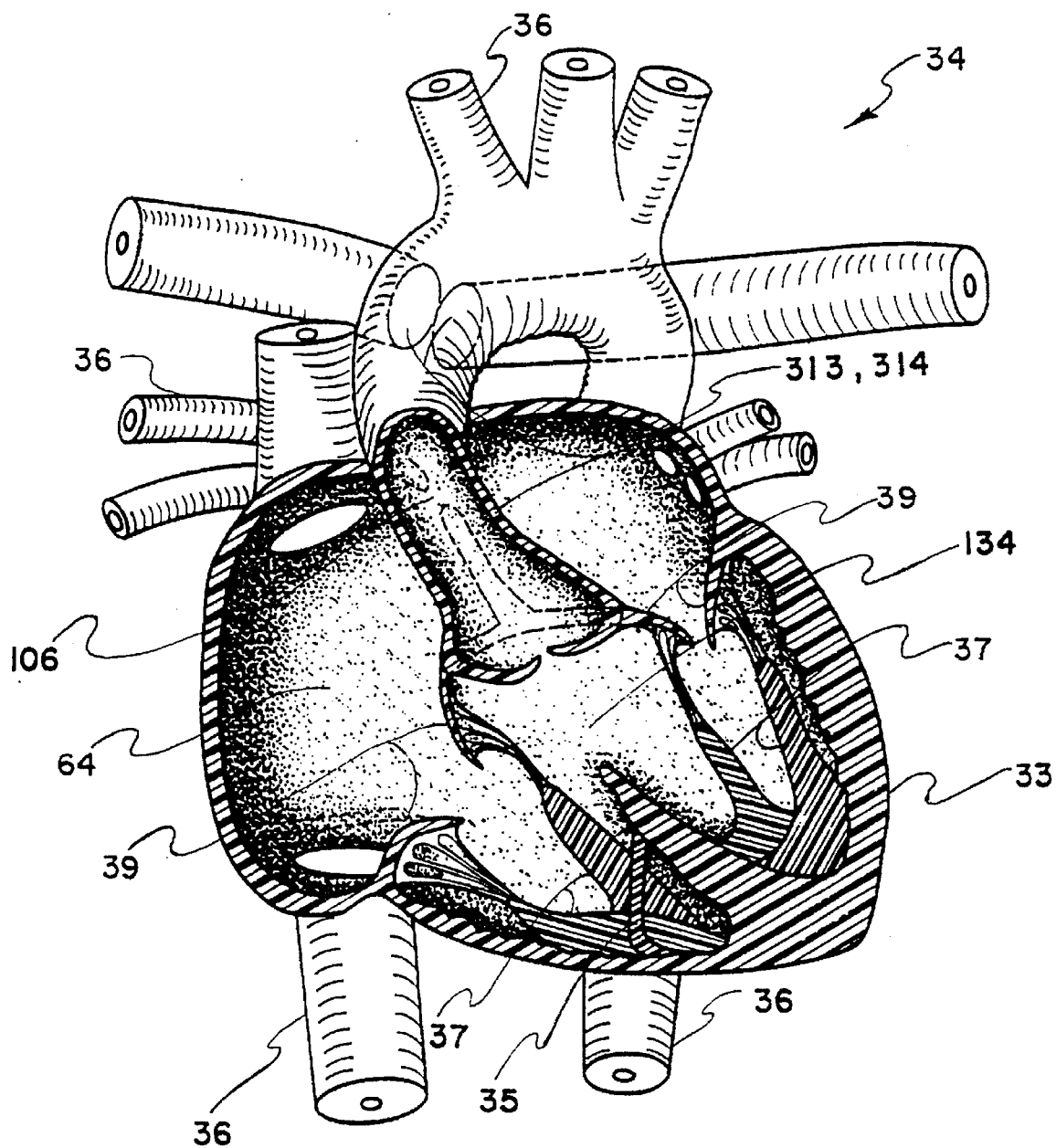
FIG. 14 is partial cutaway front view of a heart of the present invention showing the Truncus Arteriosus (TA) disorder.
Figure 15:
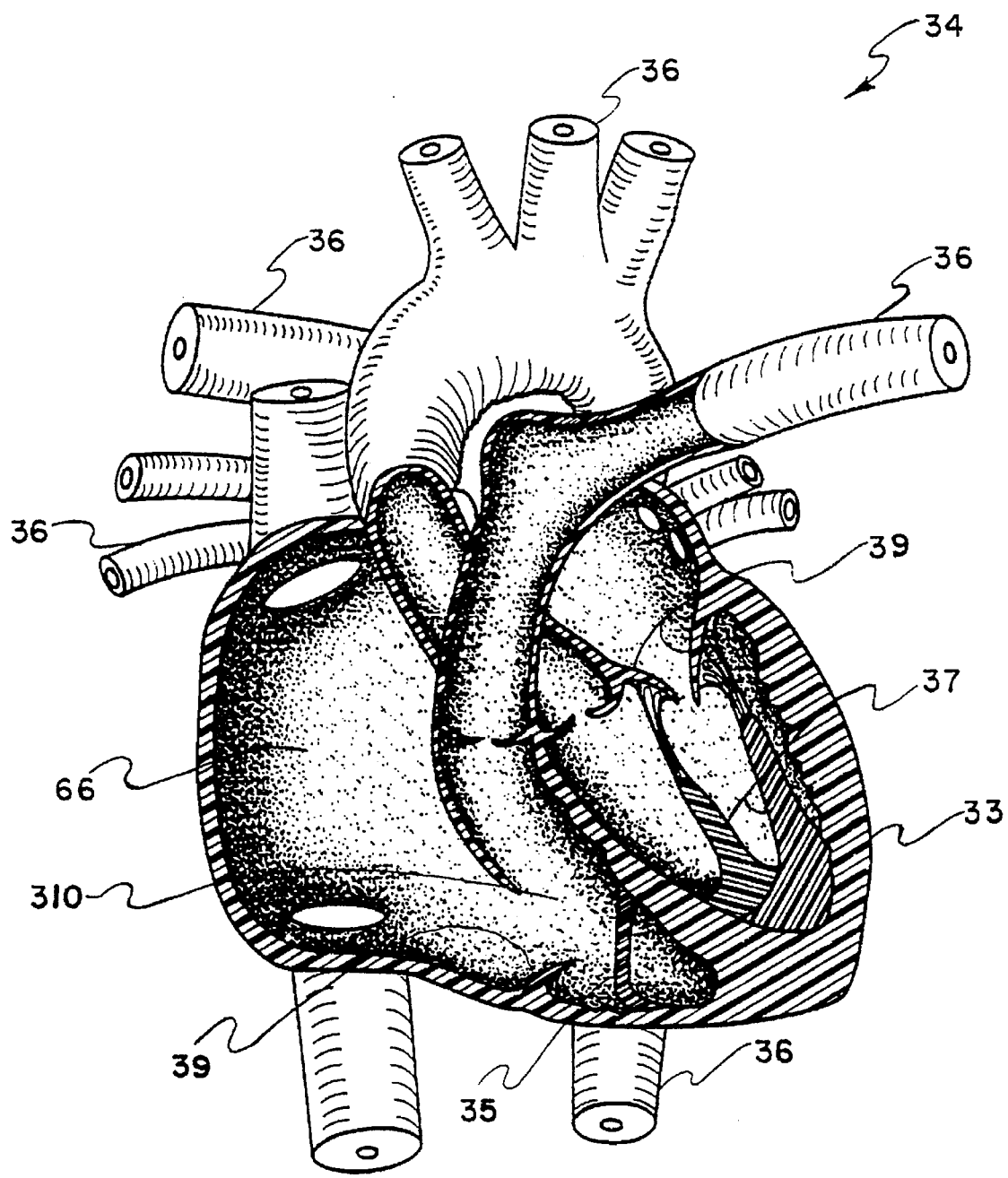
FIG. 15 is a partial cutaway front view of a heart of the present invention showing the Ebstein's Anomaly (EA) disorder.
Figure 17:
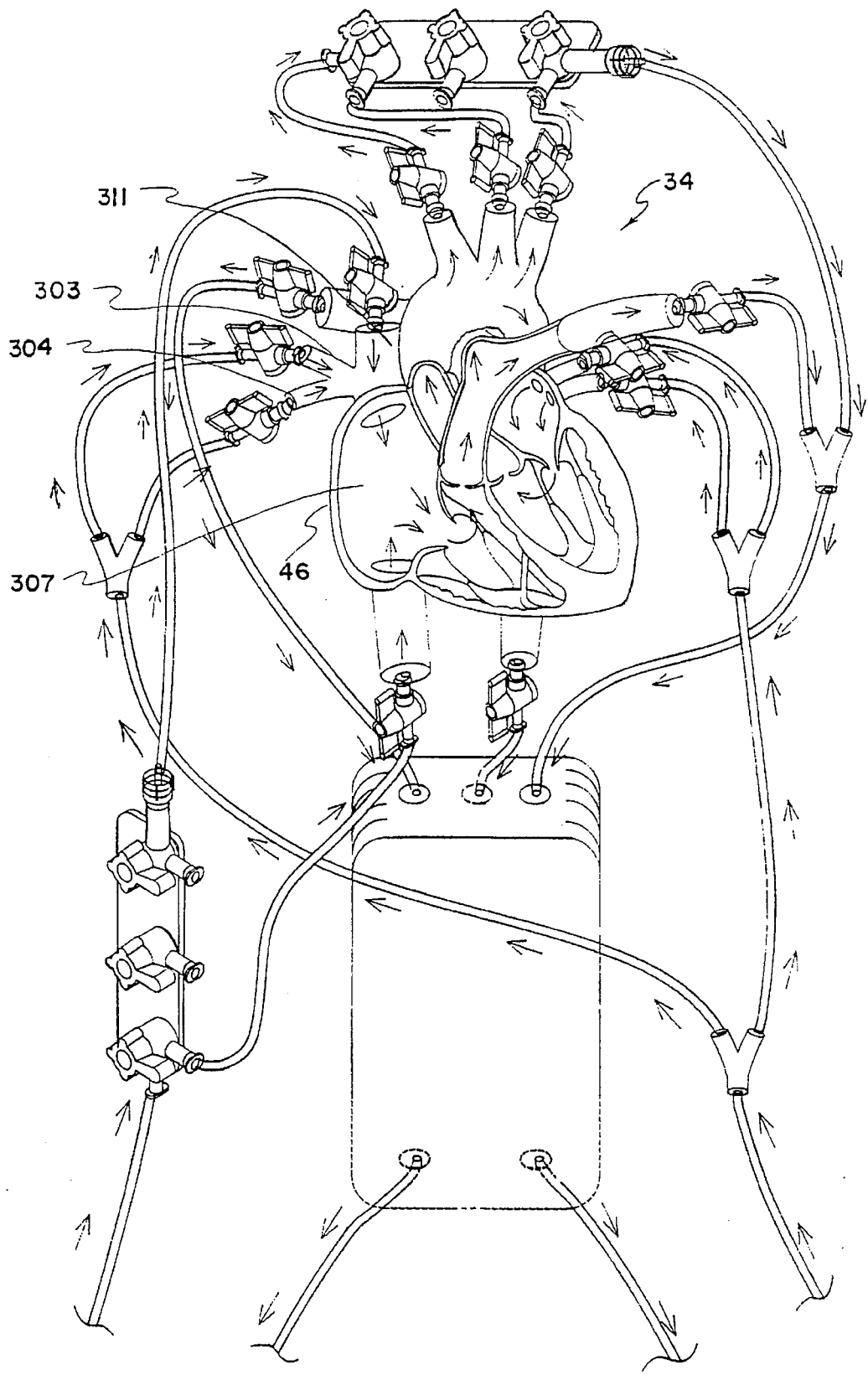
FIG. 17 is a partial, cutaway Front schematic view of a heart, conduits, and valves of the present invention, showing flow paths when a heart having a first example of the Partial Anomalous Pulmonary Venous Return (PAPVR) disorder is used.
Figure 18:
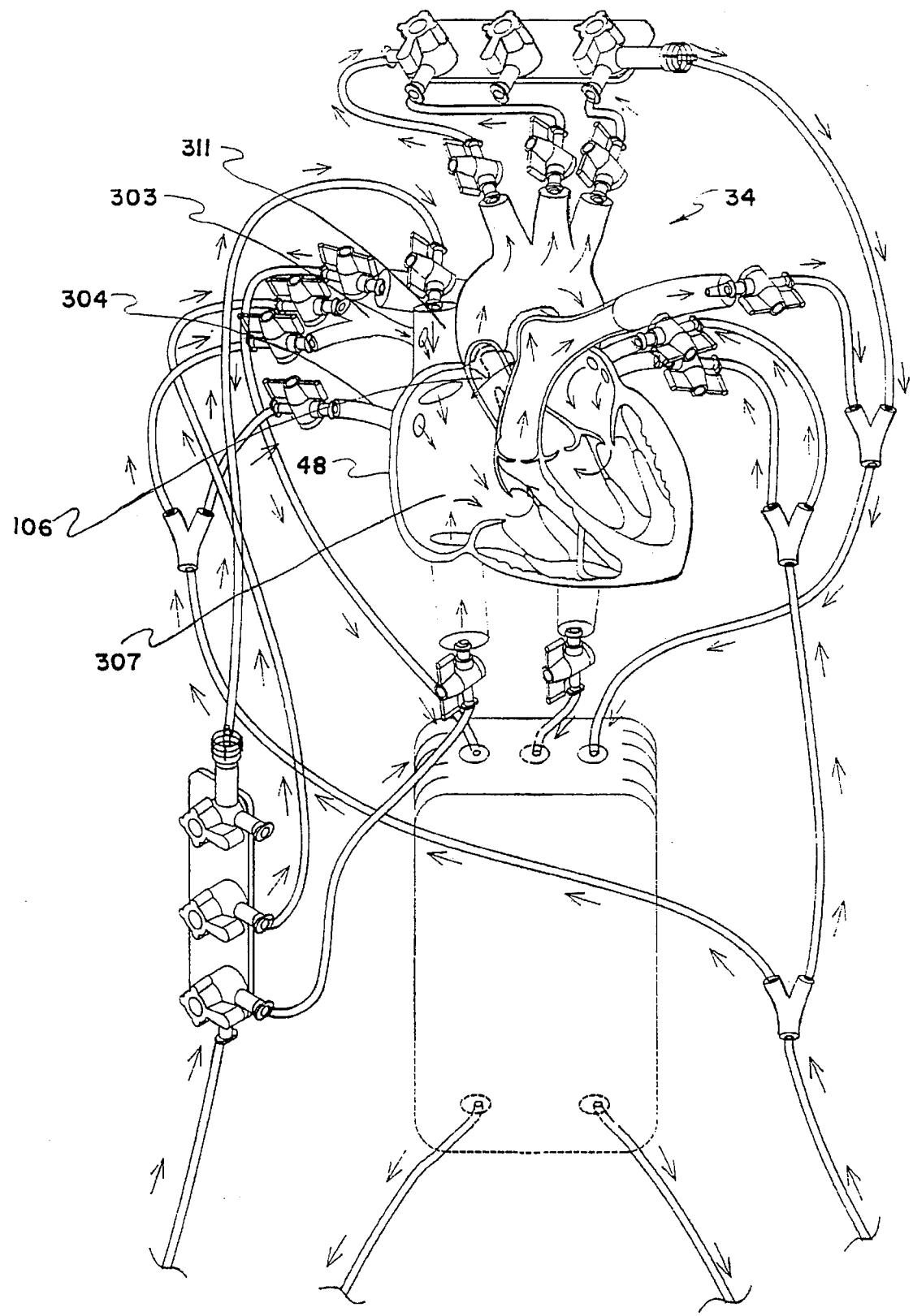
FIG. 18 is a partial, cutaway Front schematic view of a heart, conduits, and valves of the present invention, showing flow paths when a heart having a second example of the Partial Anomalous Pulmonary Venous Return (PAPVR) disorder is used.
Figure 19:
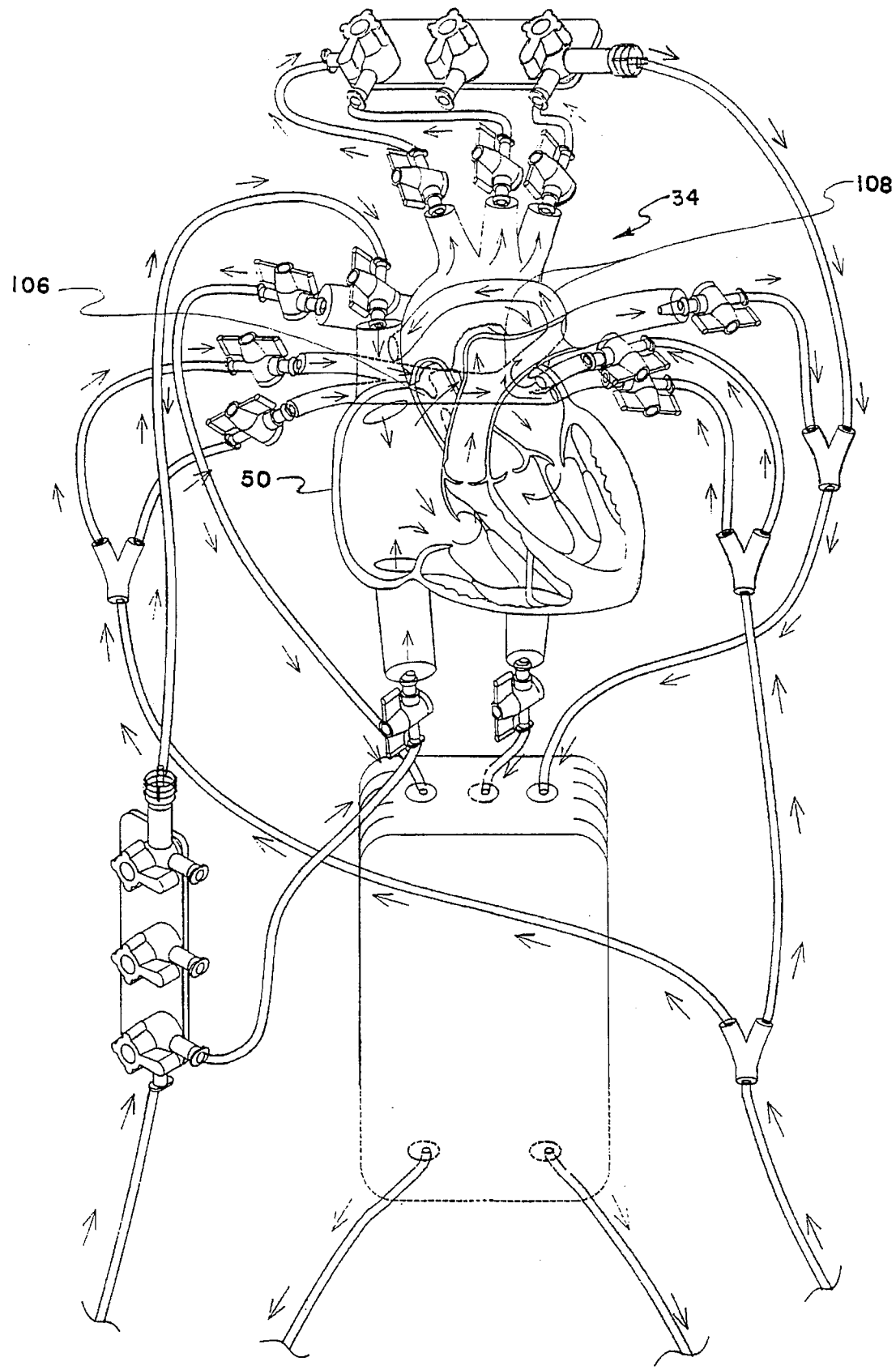
FIG. 19 is a partial, cutaway Front schematic view of a heart, conduits, and valves of the present invention, showing flow paths when a heart having a first example of the Total Anomalous Pulmonary Venous Return (TAPVR) disorder is used.
Figure 20:
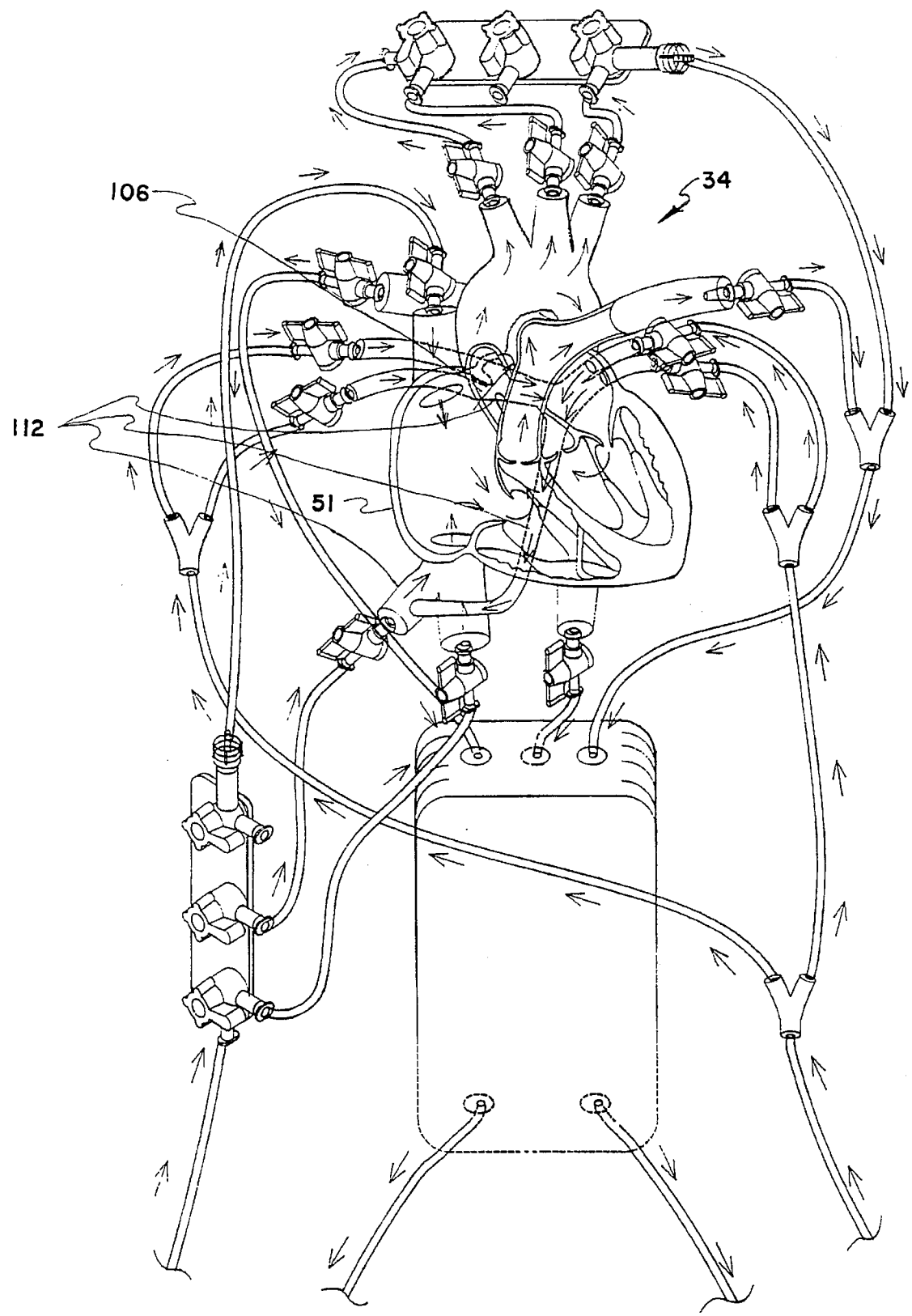
FIG. 20 is a partial, cutaway Front schematic view of a heart, conduits, and valves of the present invention, showing flow paths when a heart having a second example of the Total Anomalous Pulmonary Venous Return (TAPVR) disorder is used.
Figure 21:
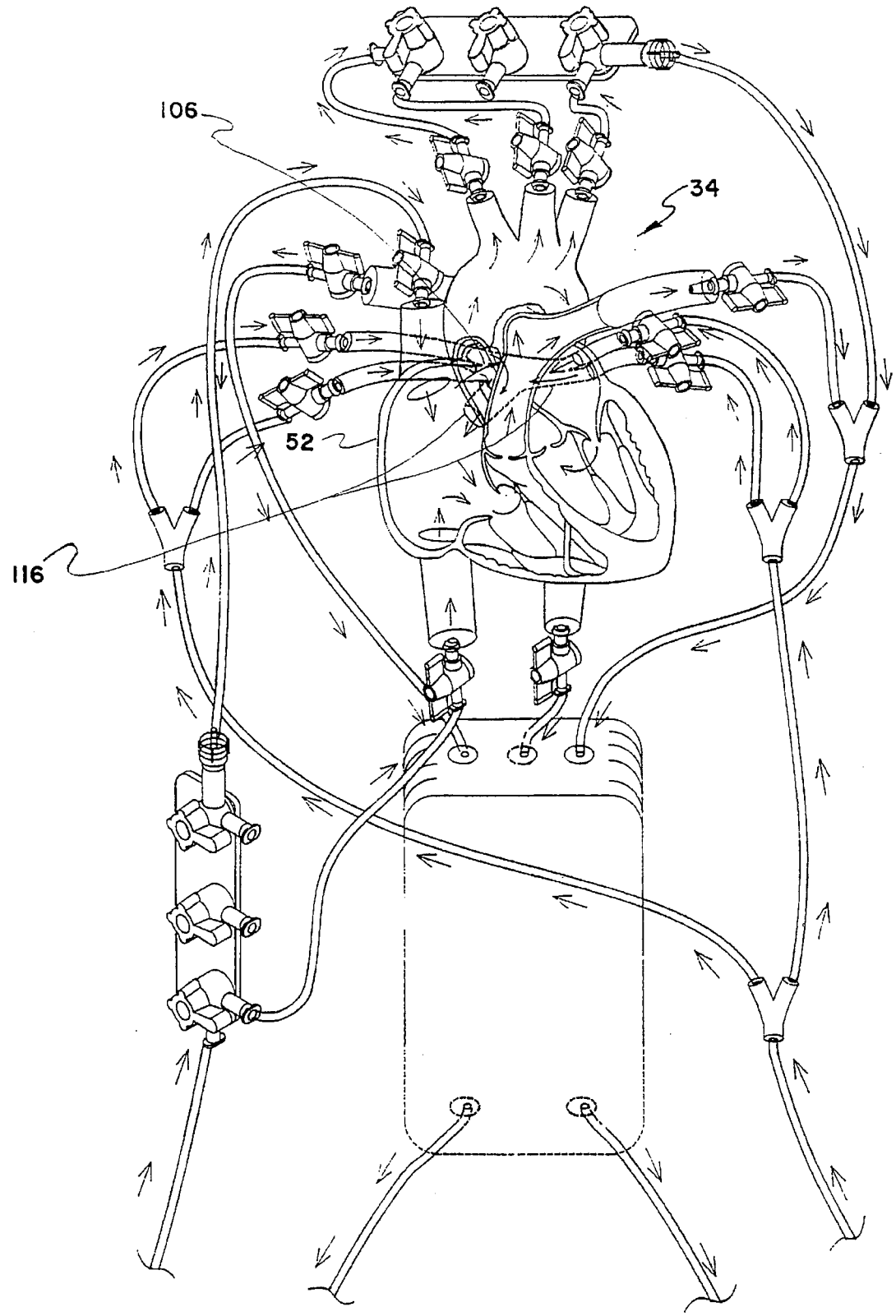
FIG. 21 is a partial, cutaway Front schematic view of a heart, conduits, and valves of the present invention, showing flow paths when a heart having a third example of the Total Anomalous Pulmonary Venous Return (TAPVR) disorder is used.
Figure 22:
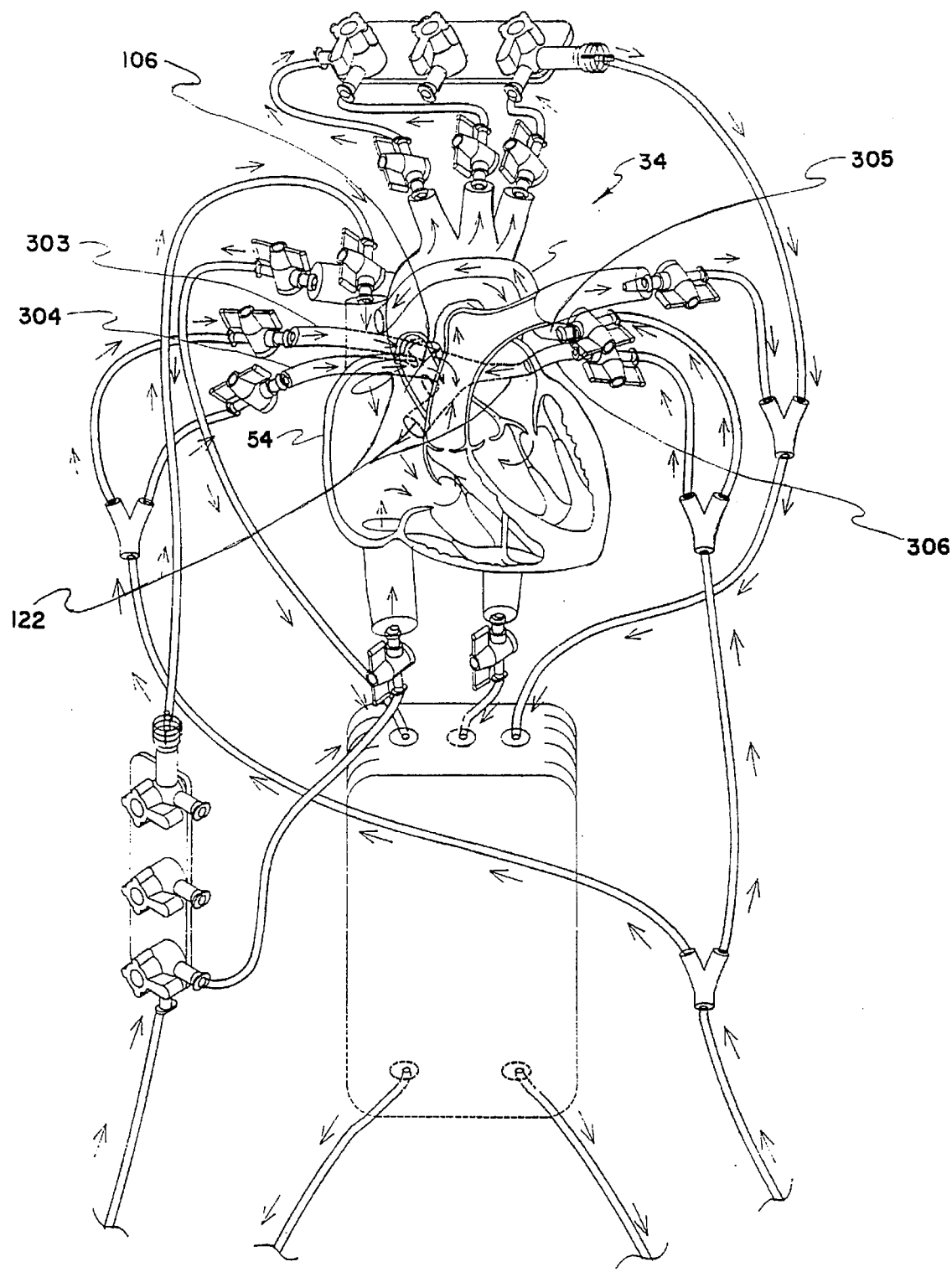
FIG. 22 is a partial, cutaway Front schematic view of a heart, conduits, and valves of the present invention, showing flow paths when a heart having a fourth example of the Total Anomalous Pulmonary Venous Return (TAPVR) disorder is used.
Figure 23:
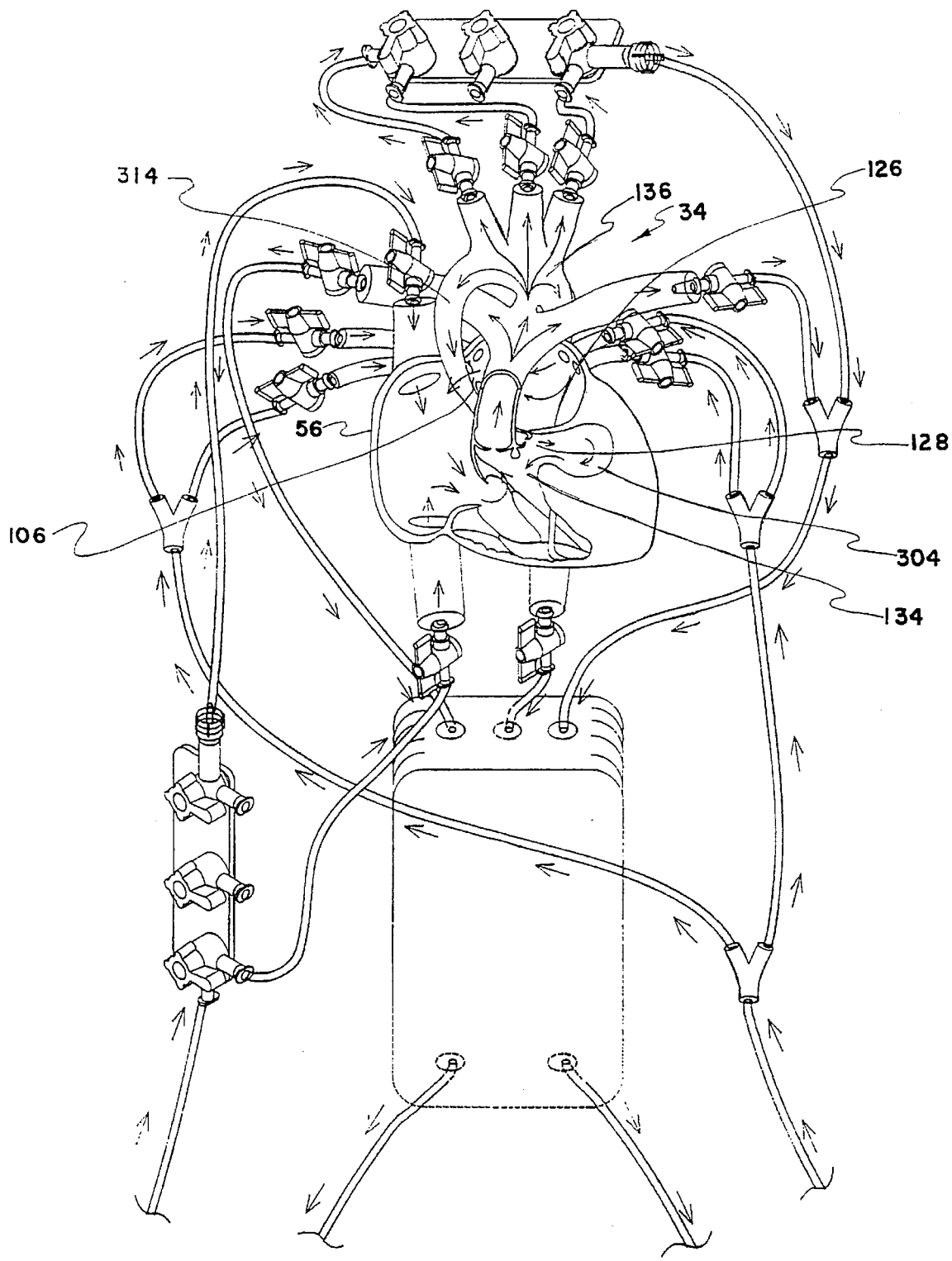
FIG. 23 is a partial, cutaway Front schematic view of a heart, conduits, and valves of the present invention, showing flow paths when a heart having the Mitral Valve Atresia (MVA) disorder is used.
Figure 24:
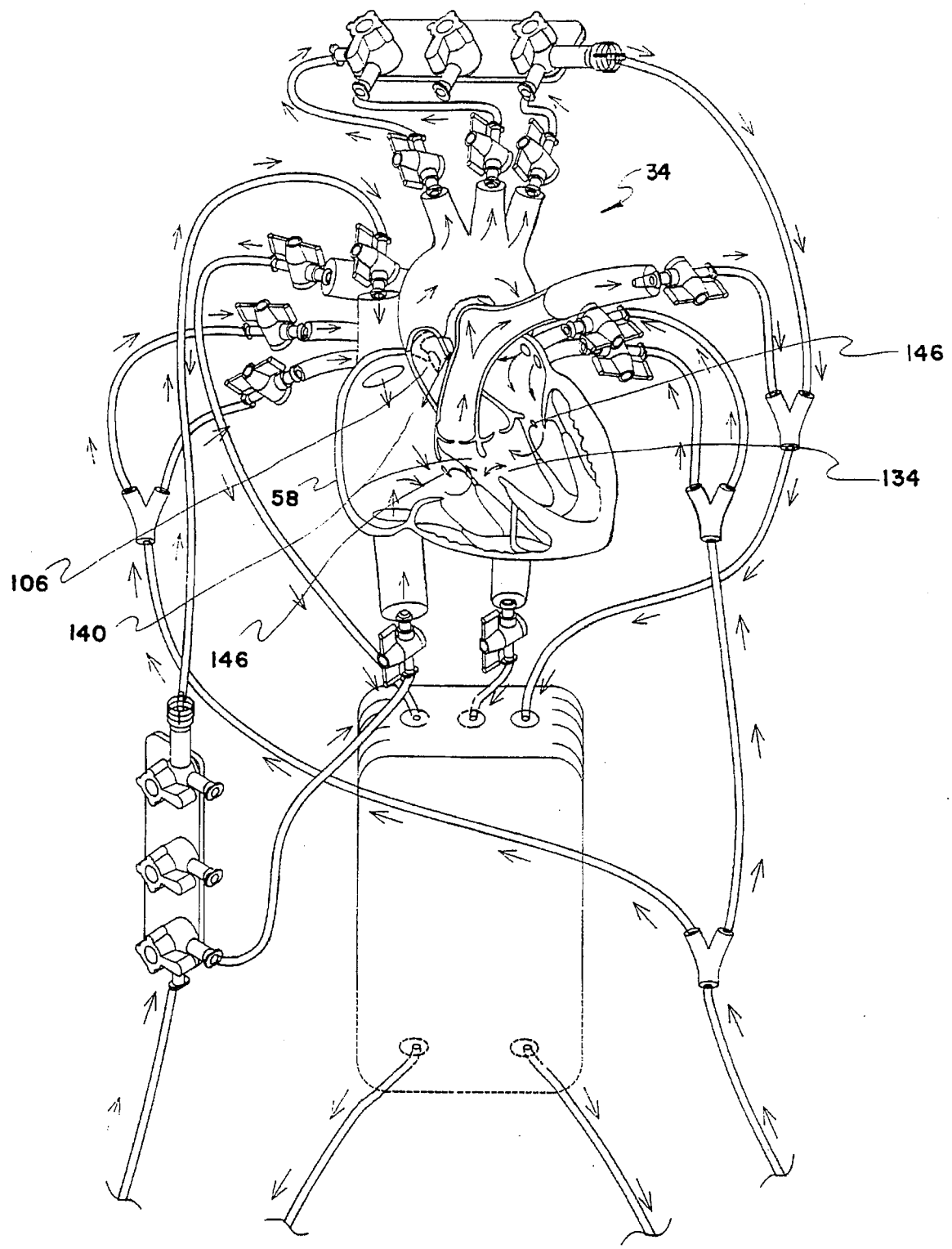
FIG. 24 is a partial cutaway Front schematic view of a heart, conduits, and valves of the present invention, showing flow paths when a heart having the Atrio-Ventricular Canal (AVC) disorder is used.
Figure 25:
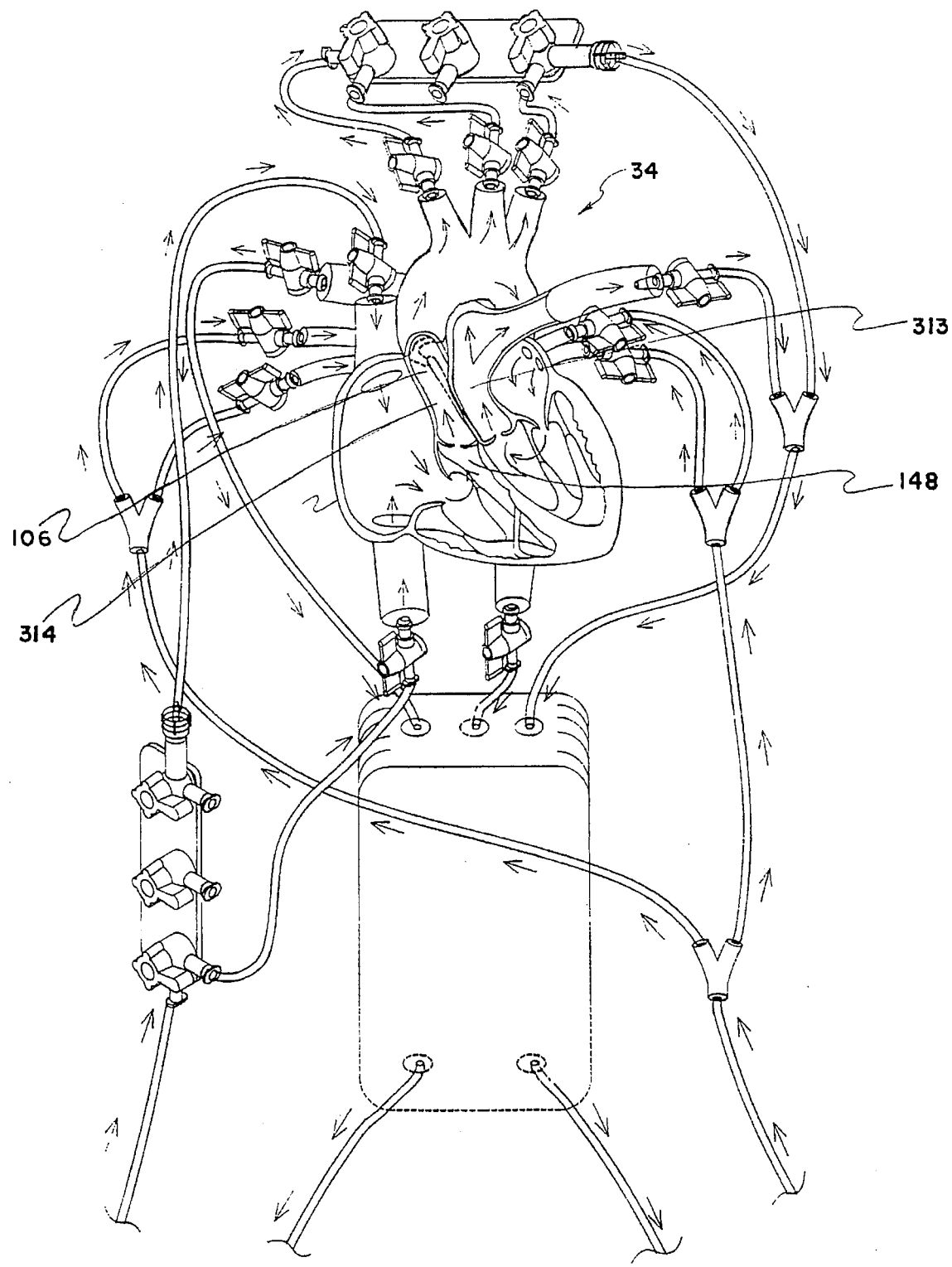
FIG. 25 is a partial cutaway Front schematic view of a heart, conduits, and valves of the present invention, showing flow paths when a heart having the Transposition of the Great Vessels (TGA) disorder is used.
Figure 26:
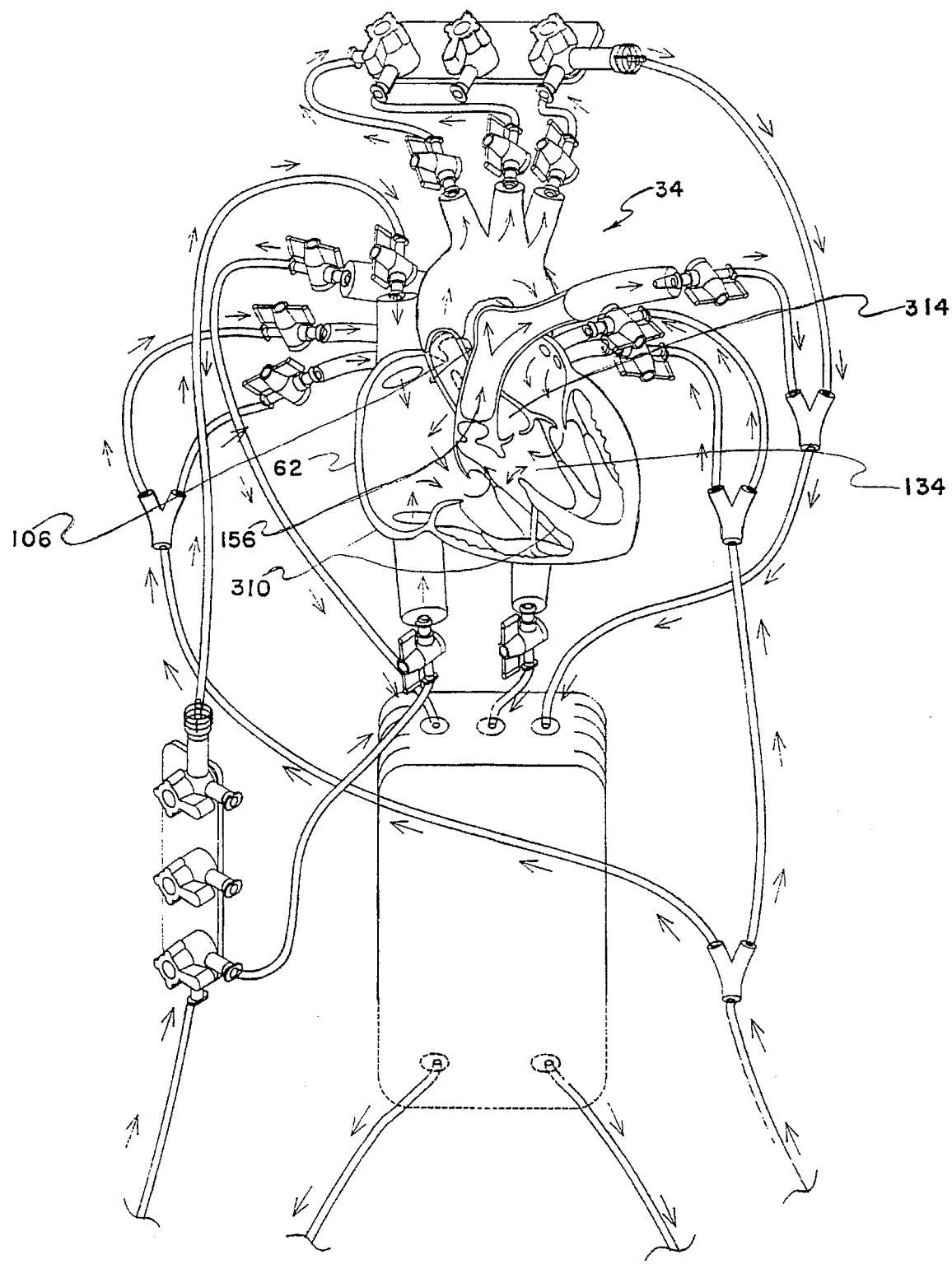
FIG. 26 is a partial cutaway Front schematic view of a heart, conduits, and valves of the present invention, showing flow paths when a heart having the Tetrology of Fallot (TOF) disorder is used.
Figure 27:
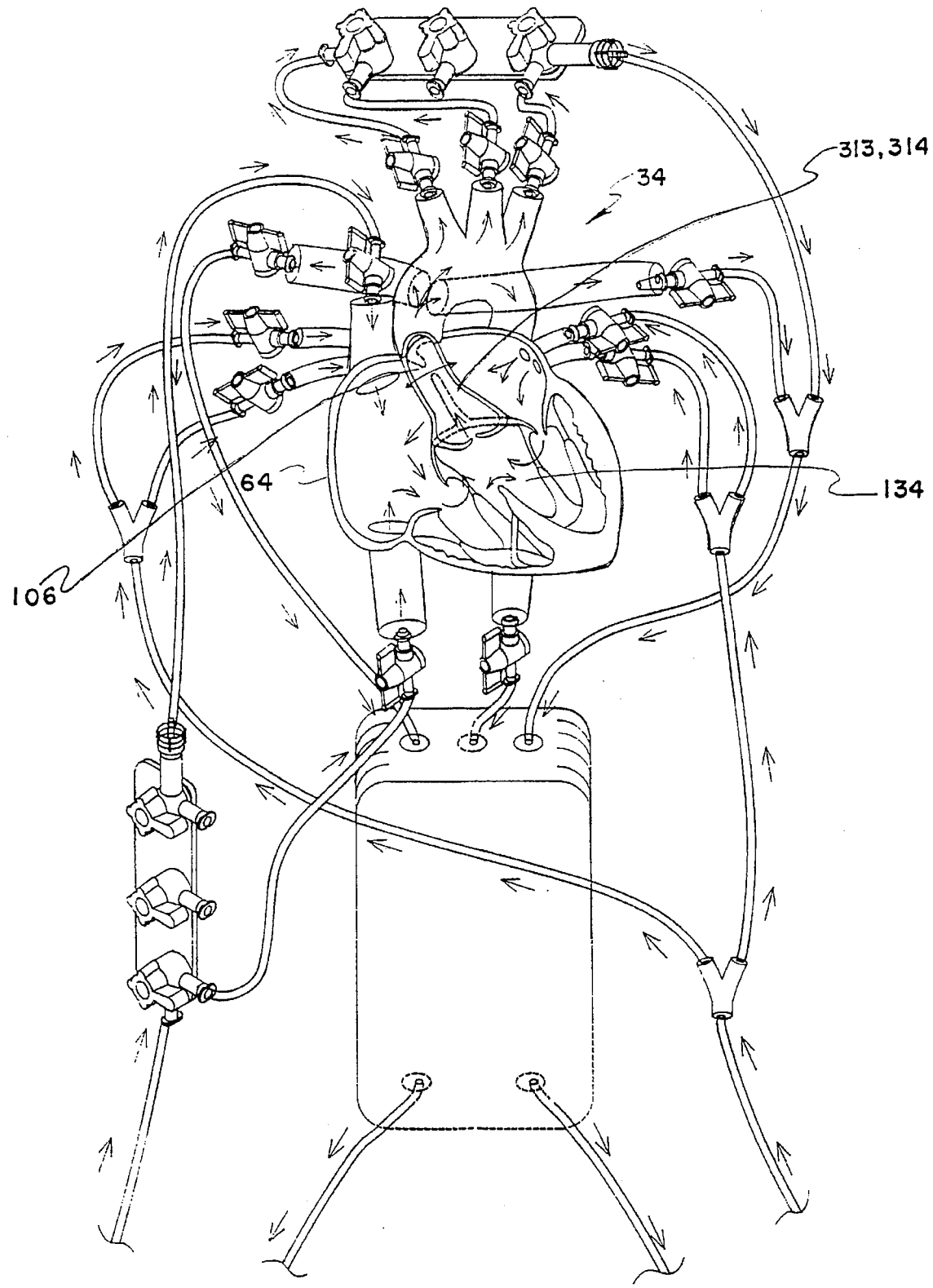
FIG. 27 is a partial cutaway Front schematic view of a heart, conduits, and valves of the present invention, showing flow paths when a heart having the Truncus Arteriosus (TA) disorder is used..
Figure 28:
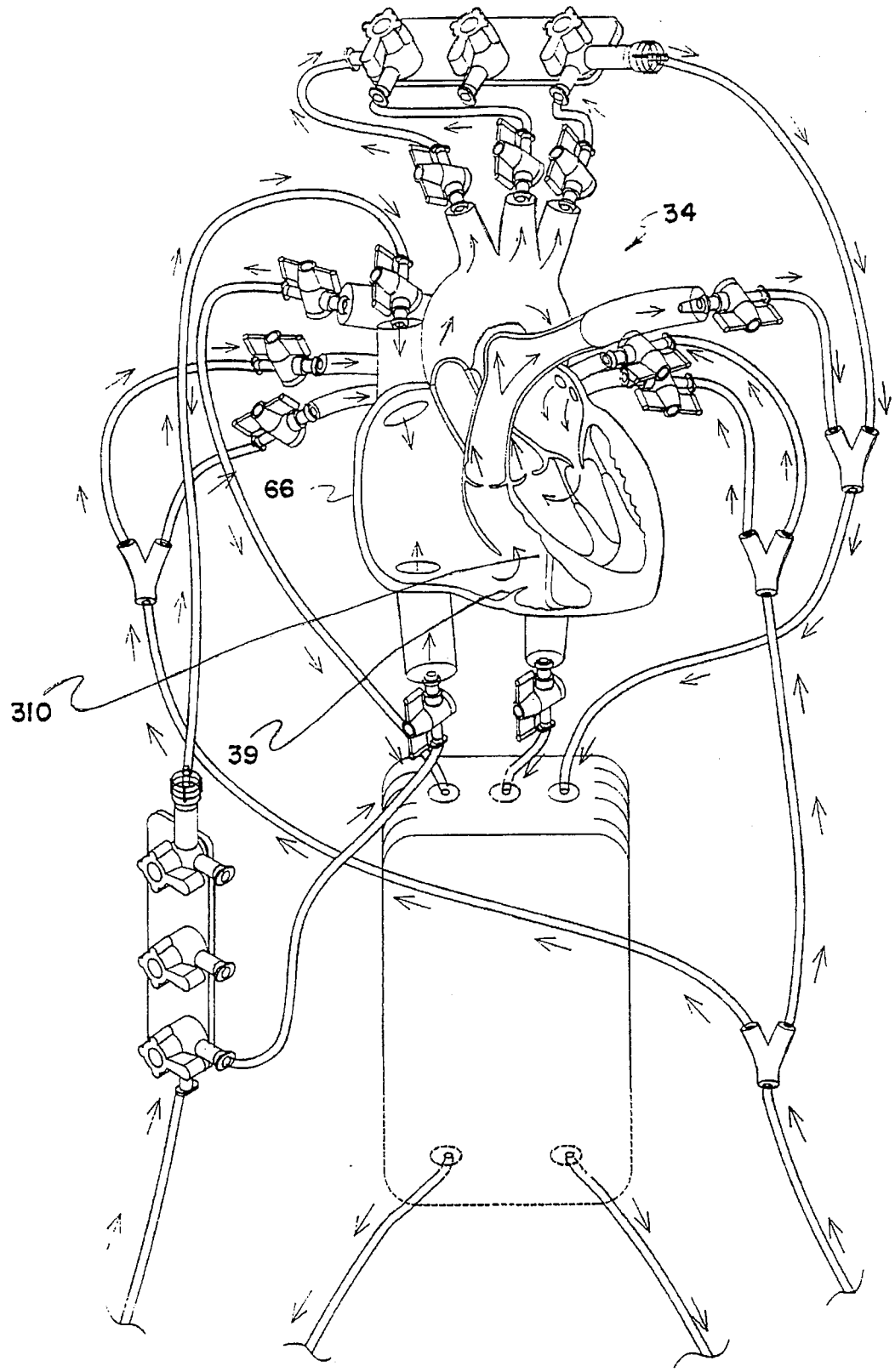
FIG. 28 is a partial cutaway Front schematic view of a heart, conduits, and valves of the present invention, showing flow paths when a heart having the Ebstein's Anomaly (EA) disorder is used.

There is a model heart 34 within the cavity 14 (FIGS. 1B and 2B). The model heart 34 is supported by partial rings 38, 41 disposed on a support bar 40 ending in a fluid-reservoir receptacle 71. Partial ring 38 mounts on the sternum-like member 22, and partial ring 41 mounts around the model heart 34. The model heart 34 has heart conduits 36 that connect to the terminal portions 24 of the body conduits 26 via the connector valves 28 disposed on the terminal portions 24. The model heart 34 can be replaced with any of several alternate model hearts 34 through a rear panel 42 in the human form 12 (FIG. 2A). . Preferably, each model heart 34 replicates either a normal heart 44 (FIGS. 3 and 16) or a heart having a defect, including the following defects, among other possibilities: a first example of the Partial Anomalous Pulmonary Venous Return (PAPVR) disorder 46, having right pulmonary veins 303, 304 that join superior vena cava 311 and right atrium 307 (FIGS. 4 and 17); a second example of the Partial Anomalous Pulmonary Venous Return (PAPVR) disorder 48, having an upper right pulmonary vein 303 joining the superior vena cava 311, and a lower right pulmonary vein 304 joining the right atrium 307, and an atrial septal defect 106 (FIGS. 5 and 18); a first example of the Total Anomalous Pulmonary Venous Return (TAPVR) disorder 50, having a misplaced left vertical (supracardiac) vein 108 and an atrial septal defect 106 (FIGS. 6 and 19); a second example of the Total Anomalous Pulmonary Venous Return (TAPVR) disorder 51, having a misplaced ductus venosus 122 and an atrial septal defect 106 (FIGS. 7 and 20); a third example of the Total Anomalous Pulmonary Venous Return (TAPVR) disorder 52 having a misplaced coronary sinus 116 and an atrial septal defect 106 (FIGS. 8 and 21); a fourth example of the Total Anomalous Pulmonary Venous Return (TAPVR) disorder 54 (FIGS. 9 and 22); the Mitral Valve Atresia (MVA) disorder 56, having aortic valve stenosis 128, a hypoplastic left ventricle 309, a hypoplastic ascending aorta 314, a ventricular septal defect 134, a patent ductus arteriosus 136, an atrial septal defect 106, and mitral valve region 126 having no mitral valve (FIGS. 10 and 23); the Atrio-Ventricular Canal (AVC) disorder 58, having an endocardial cushion defect 140, an atrial septal defect 106, a ventricular septal defect 134, and clefts 146 of the tricuspid and mitral valves (FIGS. 11 and 24); the Transposition of the Great Vessels (TGV) disorder 60, having a transposed pulmonary artery 313 and aorta 314, and an atrial septal defect 106 (FIGS. 12 and 25); the Tetrology of Fallot (TF) disorder 62, having a ventricular septal defect 134 close to aorta 314, an atrial septal defect 106, and a pulmonary artery valve 156 is abnormally small (FIGS. 13 and 26); the Truncus Arteriosus (TA) disorder 64, having a ventricular septal defect 134 and an atrial septal defect 106 (FIGS. 14 and 27); and the Ebstein's Anomaly (EA) disorder 66, having a displaced tricuspid valve 39 (FIGS. 15 and 28). In each example of the model heart 34, there is a moderator band 35 that interconnects walls 33 of the model heart 34 to prevent undesirable turbulence in fluid flow through the model heart 34. There are also papillary muscle members 37 that connect the walls 33 of the heart model 34 to heart valves 39, preventing failure of heart valves 39. Consequently, blockage and reversal of fluid flow within the model heart 34 are avoided.

Figure 1B:
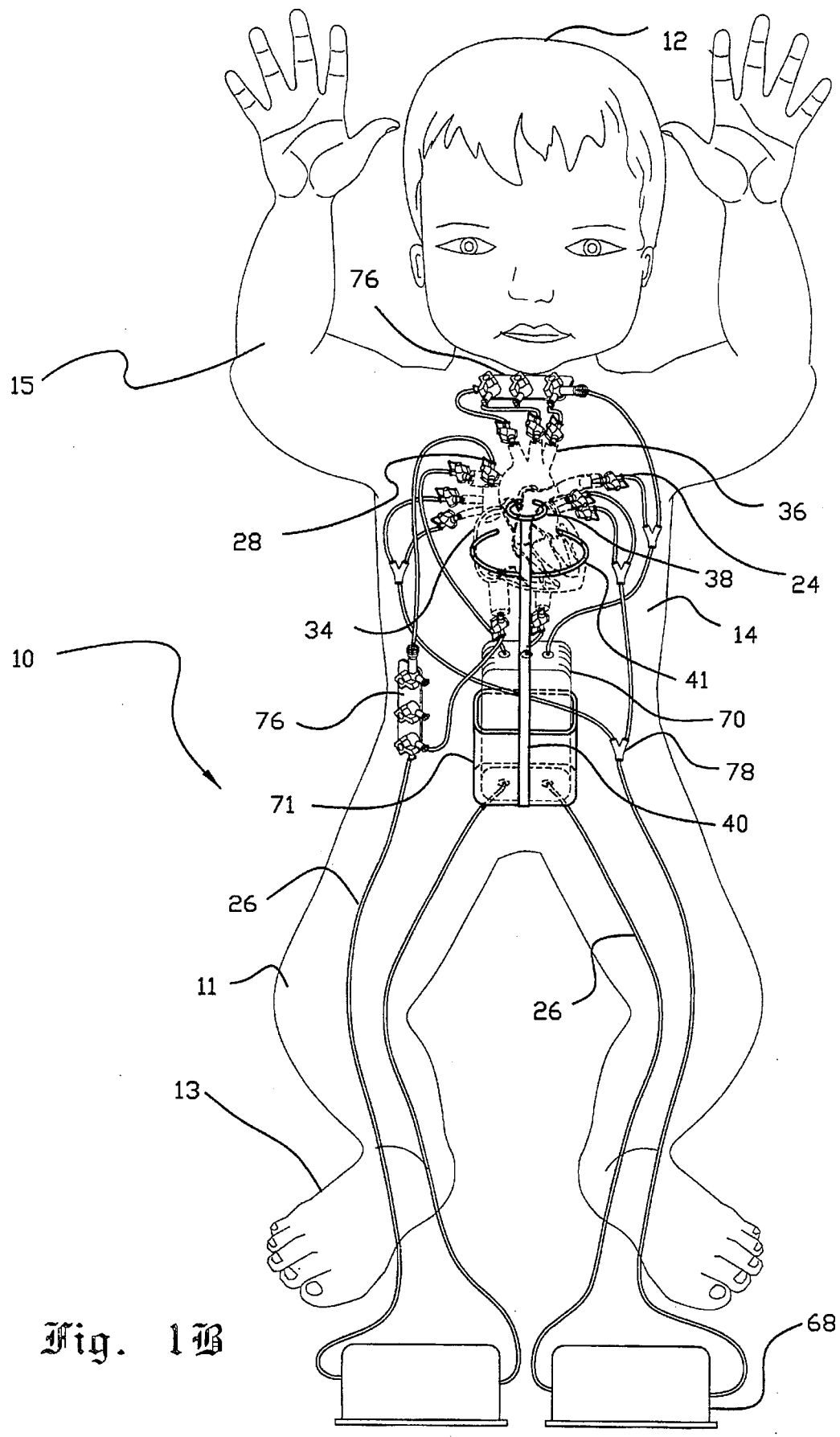
FIG. 1B is a front perspective, view of the present invention, shown without supporting ribs.
Figure 1C:
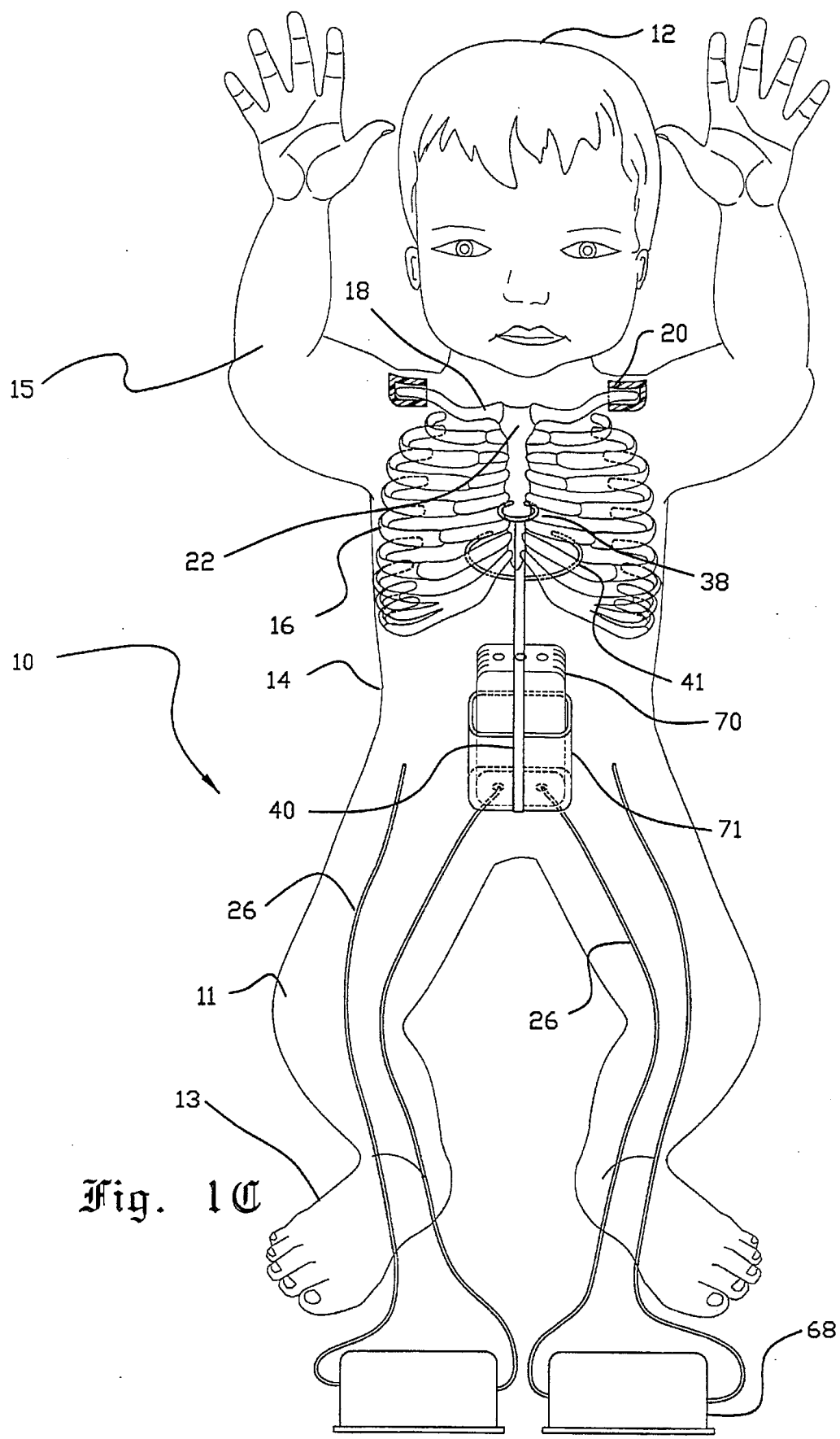
FIG. 1C is a front perspective, of the present invention, shown without a heart but with supporting ribs.

There are pump units 68 of known type disposed integrally with the human form 12 or adjacent to the human form 12, as shown in FIG. 1A. These pump units 68 pump fluid, preferably fluid that is known to be at least partially opaque to sonographic equipment, through the body conduits 26, heart conduits 36, and the model heart 34.

There is a fluid reservoir 70 disposed in the fluid-reservoir receptacle 71 within the human form 12. The reservoir 70 ensures that adequate fluid circulates through the conduits 26, 36 and heart model 34, regardless of what type of heart model 34 is used. The fluid reservoir receptacle 71. is attached to support bar 40.

Figure 16:
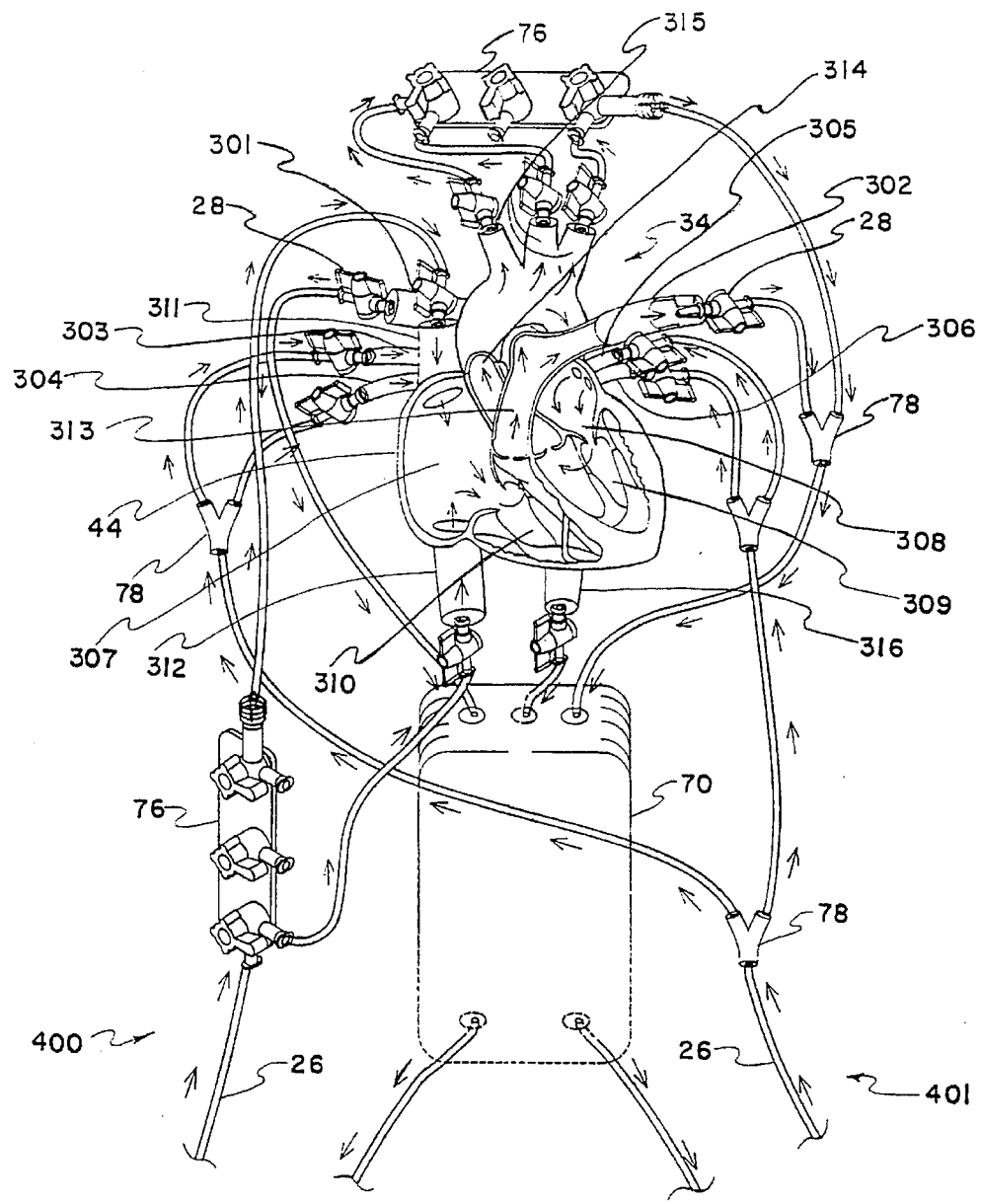
FIG. 16 is a partial cutaway Front schematic view of a heart, conduits, valves and pump of the present invention, showing flow paths when a normal heart is used.
Figure 16:
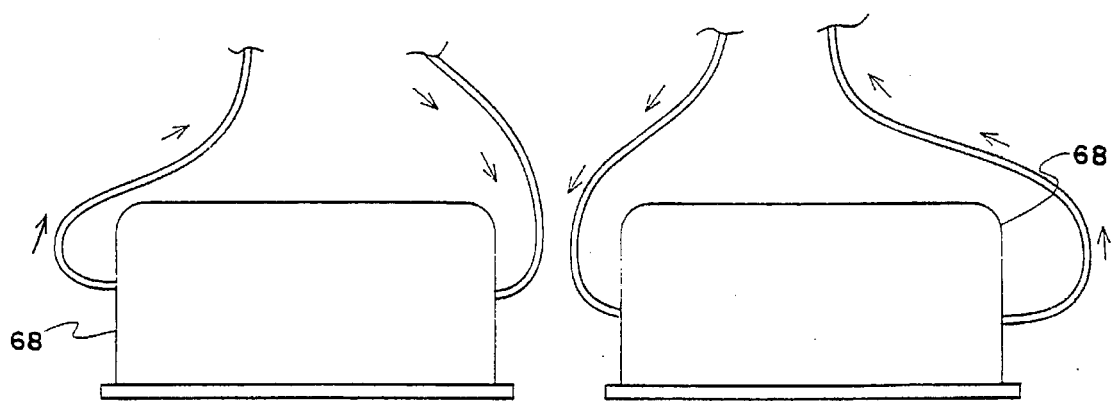

Flow of fluid through the teaching aid 10, is shown in FIG. 16, where a normal heart model 34 is in position in the cavity 14. In a venous flow path 400, left side pump 68 forces fluid through body conduits 26, manifold 76, Y-connector 78, connector valves 28 through inferior vena cava 312, superior vena cava 311 into the right atrium 307 through right ventricle 310 through pulmonary artery 313 through right pulmonary artery 301 and left pulmonary artery 302 to fluid reservoir 70. In an arterial flow path 401, the right side pump 68 forces fluid through body conduits 26, Y-connector 78, connector valves 28, lower right pulmonary vein 304, upper right pulmonary vein 303, lower left pulmonary vein 306, and upper left pulmonary vein 305, through the left atrium 308, and the left ventricle 309, then through the ascending aorta 314, to a branching aorta 315, and a descending aorta 316, and finally to the fluid reservoir 70. Fluid from the fluid reservoir 70 flows to the pump 68.

Figure 2A:
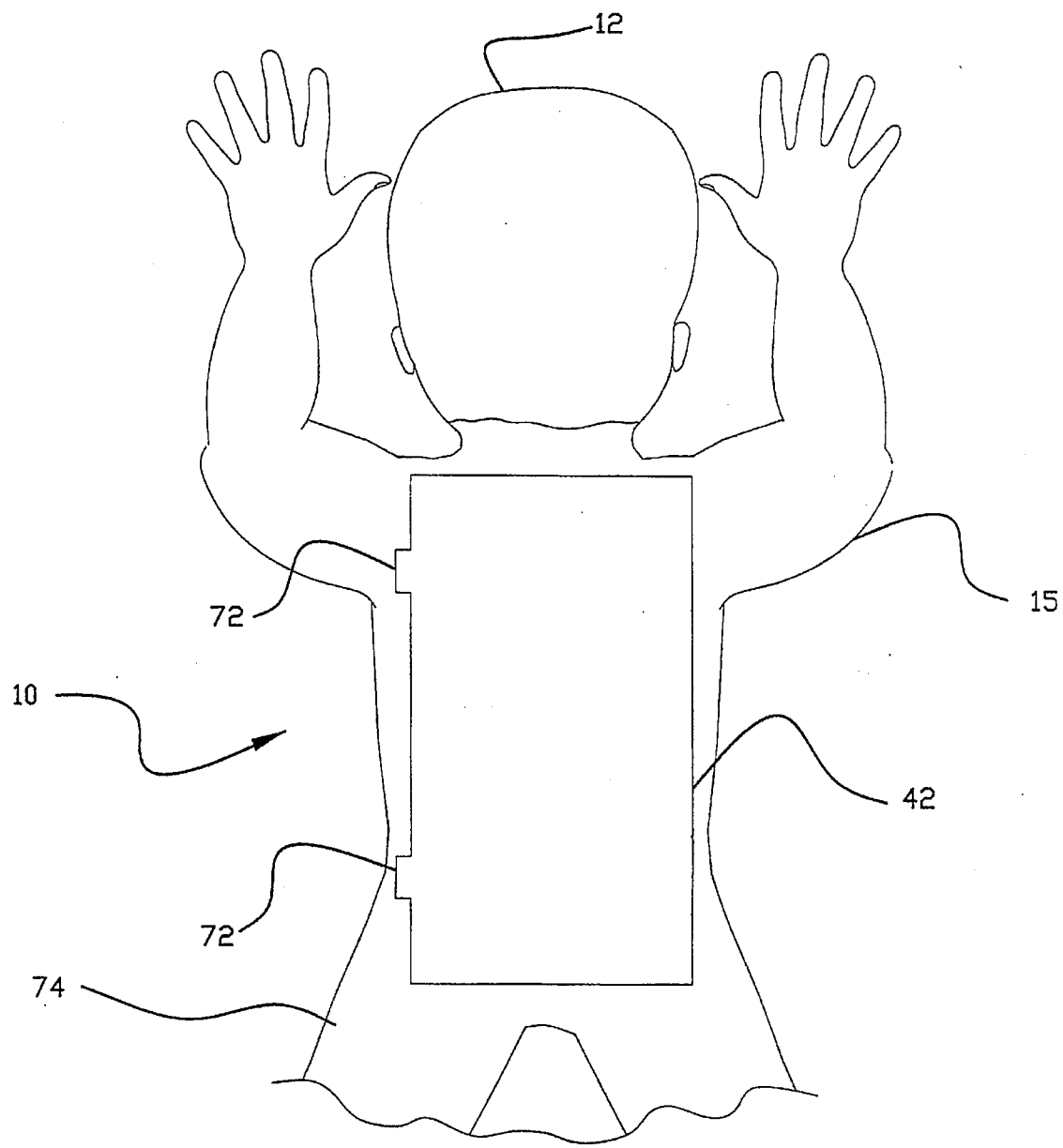
FIG. 2A is a back perspective view of the present invention, showing the rear panel covering the rear entry through which a heart can be replaced.
Figure 2B:
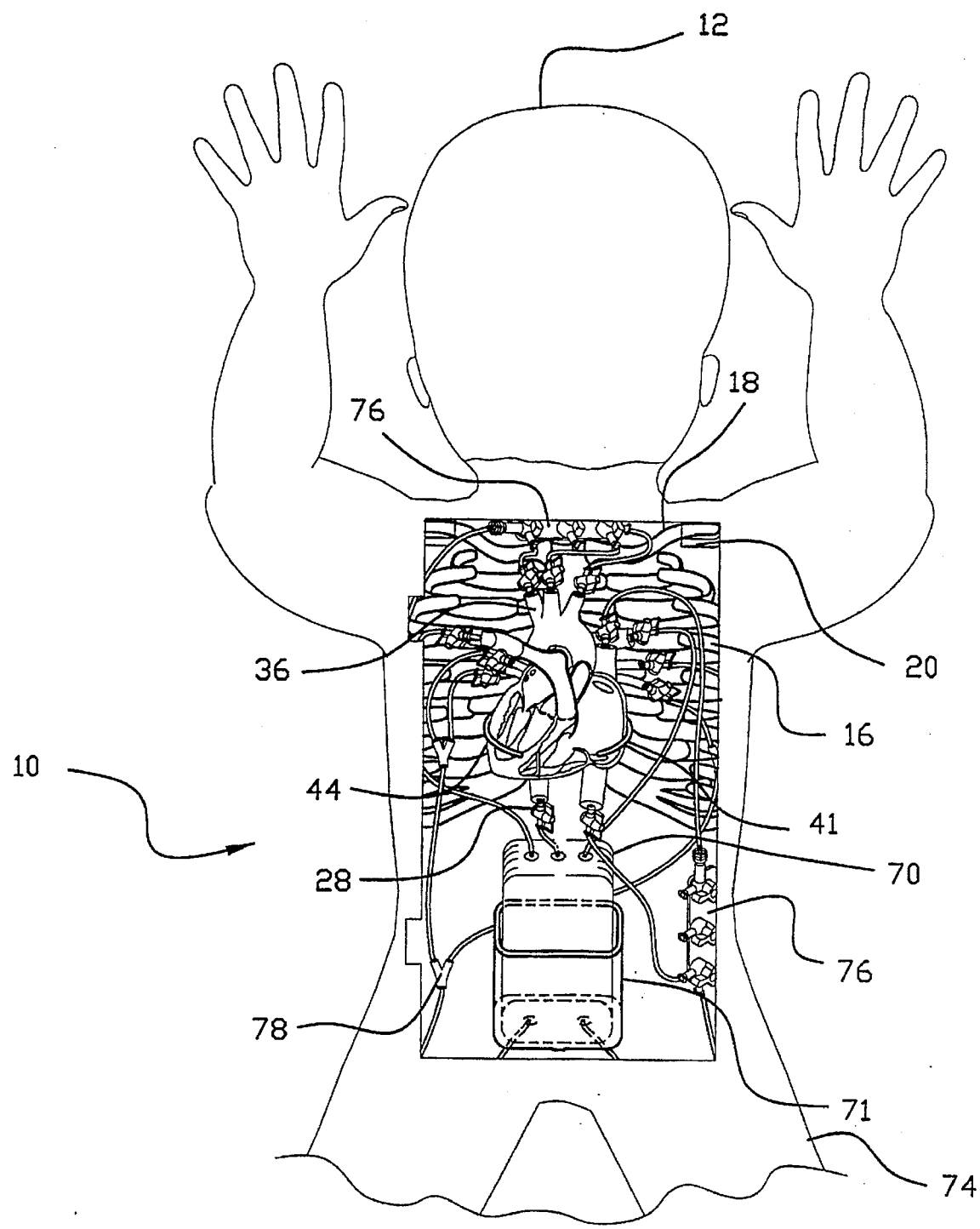
FIG. 2B is a back perspective view of the present invention, showing the uncovered rear entry through which a heart can be replaced, as well as a heart and supporting ribs.

In use, the human form 12 is examined by a user to determine whether the desired heart model 34 is in place (FIG. 2A). Such checking can be accomplished by opening the rear panel 42, which is attached by known means such as hinges at an edge 72 of the rear panel 42 to a back side 74 of the human form 12. If the heart model 34 in the human form 12 is not the desired heart model 34, the heart model 34 in the human form 12 may be replaced with the desired heart model 34. Such replacement is accomplished by fully opening the rear panel 42, disconnecting all connector valves 28 connecting body conduits 26 to heart conduits 36, and physically withdrawing the model heart 34 that is within the human form 12. The desired model heart 34 is then inserted into the human form 34, the connector valves 28 that were disconnected are re-connected to the heart conduits 36 of the desired heart model 34, and the rear panel 42 is closed. Importantly, there are manifold valves 76 and Y-connectors 78 that ensure appropriate connections between body conduits 26 and heart conduits 36, regardless of whether a particular heart model 34 replicating a disorder has more or fewer heart conduits 36 than a heart model 34 replicating a normal heart 44.

Once the desired heart model 34 is installed in the human form 12, the human form 12 is placed upon a sonography machine in the same manner in which a human would be so placed. The sonography machine is prepared and operated in a conventional manner. The ribs 16 prevent crushing of the heart model 34 in the human form.

Once the human form 12 is properly positioned on the sonography machine, the pump units 68 are activated. Activation of the pump units 68, accomplished by known means, brings about pumping of fluid through the body conduits 26, heart conduits 28, heart model 34, and fluid reservoir 70. With the human form 12 properly positioned and the fluid pumping, an image provided by the sonography machine will accurately simulate that provided by the sonography machine when a real human having a real heart like that replicated by the heart model 34 is positioned on the sonography machine. In this way, the teaching aid 10 of the present invention not only provides practice with use of a sonography machine, but also provides practice in recognition of heart disorders.

It is to be understood that the present invention is not limited to the sole embodiment described above, but encompasses any and all embodiments within the scope of the following claims.

I claim:

1. A teaching aid for sonographic analysis of the blood flow through a defective heart and in combination with a sonographic device comprising:

a human form having a hollow chest cavity;

a plurality of heart models, each dimensioned and configured so as to represent a different structural heart defect;

said structural heart defect replicates a disorder selected from the group consisting of a first example of a Partial Anomalous Pulmonary Venous Return, a second example of a Partial Anomalous Pulmonary Venous Return, a first example of a Total Anomalous Pulmonary Venous Return, a second example of a Total Anomalous Pulmonary Venous Return, a third example of a Total Anomalous Pulmonary Venous Return, a fourth example of a Total Anomalous Pulmonary Venous Return, a Mitral Valve Atresia, an Atrioventricular Canal, a Transposition of the Great Vessels, a Tetrology of Fallot, a Truncus Arteriosus, and an Ebstein's Anomaly;

each of said heart models having heart walls and internal valves being disposed in said hollow chest cavity separately a circulatory system removably attachable to each of said plurality of heart models;

an opening in said human form through which each said heart model is insertable into said hollow chest cavity; and a sonographic device for analysis of the blood flow through at least one of said defective heart models.

2. The teaching aid according to claim 1, further including partial ribs within said cavity, said ribs preventing said cavity from collapsing.

3. The teaching aid according to claim 2, wherein said ribs are dimensioned and configured to allow passage of said heart model from within said ribs in said cavity to outside of said cavity.

4. The teaching aid according to claim 2, further comprising:

a sternum-like member connected to said ribs;

flexible clavicle-like members connected to said sternum-like member;

receptacles in said cavity dimensioned and configured to receive said clavicle-like members; and whereby insertion of said clavicle-like members in said receptacles anchors said clavicle-like members, said sternum-like members, and said ribs in said human form.

5. The teaching aid according to claim 2, further comprising:

a sternum-like member connected to said ribs; and a support bar anchored within said human form and dimensioned and configured to connect to said sternum-like member and to support said heart model.

6. The teaching aid according to claim 1, further including:

hollow legs;

hollow feet;

conduits passing between said heart model and said feet, via said legs; and at least one pump unit dimensioned and configured to receive said conduits at said feet and to pump fluid through said conduits.

7. The teaching aid according to claim 6, further including:

a fluid reservoir a receptacle dimensioned and configured to receive said fluid reservoir and disposed within said chest cavity, said fluid reservoir being releasably received within said receptacle.

8. The teaching aid according to claim 1, wherein said heart model has moderator bands connecting said walls of said heart model.

9. The teaching aid according to claim 1, wherein said heart model has papillary muscle members connecting said walls of said heart model to said valves of said heart model.

* * * * *